(12) United States Patent
Kuroda et al.

(10) Patent No.: US 10,954,836 B2
(45) Date of Patent: Mar. 23, 2021

(54) CONTROL APPARATUS FOR INTERNAL COMBUSTION ENGINE

(71) Applicant: TOYOTA JIDOSHA KABUSHIKI KAISHA, Toyota (JP)

(72) Inventors: Ryusuke Kuroda, Nagoya (JP); Masanao Idogawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/447,314

(22) Filed: Jun. 20, 2019

(65) Prior Publication Data

US 2020/0049046 A1 Feb. 13, 2020

(30) Foreign Application Priority Data

Aug. 7, 2018 (JP) .............................. JP2018-148053

(51) Int. Cl.
*F01N 3/10* (2006.01)
*F02B 1/04* (2006.01)
(Continued)

(52) U.S. Cl.
CPC ................ *F01N 3/101* (2013.01); *F02B 1/04* (2013.01); *F02D 41/0002* (2013.01);
(Continued)

(58) Field of Classification Search
CPC .......... F01N 3/009; F01N 3/023; F01N 3/035; F01N 3/101; F01N 9/002; F01N 2560/025; F01N 2560/06; F01N 2560/14; F01N 2900/1602; F02B 1/04; F02D 17/02; F02D 37/02; F02D 41/0005; F02D 41/0087; F02D 41/1454; F02D 41/38; F02D 41/0002; F02D 41/008; F02D 41/247; F02D 41/3029;
(Continued)

(56) References Cited

U.S. PATENT DOCUMENTS

| | | |
|---|---|---|
| 4,186,715 A | 2/1980 | Iizuka et al. |
| 8,776,507 B2 | 7/2014 | In et al. |

(Continued)

FOREIGN PATENT DOCUMENTS

| | | |
|---|---|---|
| DE | 102012105728 A1 | 4/2013 |
| EP | 0725211 A1 | 8/1996 |

(Continued)

*Primary Examiner* — Audrey K Bradley
*Assistant Examiner* — Dapinder Singh
(74) *Attorney, Agent, or Firm* — Oliff PLC

(57) ABSTRACT

A control apparatus for an internal combustion engine includes an electronic control unit configured to i) perform a fuel introduction process, ii) calculate a total injection amount in the fuel introduction process, and control each of fuel injection valves based on a required injection amount per cylinder when the fuel introduction process is performed, and iii) perform a cylinder deactivation process for stopping fuel from being injected for one or some of cylinders, and controlling each of the fuel injection valves such that an amount of the fuel obtained by dividing the total injection amount is injected for a cylinder or cylinders other than the one or some of the cylinders for which the fuel is stopped from being injected, when the fuel introduction process is performed.

8 Claims, 7 Drawing Sheets

(51) Int. Cl.
*F02D 41/00* (2006.01)
*F02D 41/30* (2006.01)
(52) U.S. Cl.
CPC ........ *F02D 41/008* (2013.01); *F02D 41/3029* (2013.01); *F02D 2250/12* (2013.01)
(58) Field of Classification Search
CPC ....... F02D 2041/389; F02D 2200/0614; F02D 2200/0802; F02D 2250/12; F02P 15/1512; Y02T 10/12; Y02T 10/40
USPC ................. 60/278, 287, 288, 286, 295, 297, 60/299–301, 311, 285; 123/179.4, 299; 701/104
See application file for complete search history.

(56) References Cited

U.S. PATENT DOCUMENTS

| | | |
|---|---|---|
| 9,879,632 B2 | 1/2018 | Smith |
| 2008/0148719 A1 | 6/2008 | Hermansson et al. |
| 2013/0091828 A1* | 4/2013 | In .......................... F01N 3/101 60/274 |
| 2015/0144107 A1* | 5/2015 | Smith ................... F02D 41/008 123/445 |
| 2018/0209363 A1 | 7/2018 | Suzuki |

FOREIGN PATENT DOCUMENTS

| | | |
|---|---|---|
| EP | 1936158 A1 | 6/2008 |
| FR | 2924159 A1 | 5/2009 |
| GB | 2503468 A | 1/2014 |
| KR | 10-2013-0040268 A | 4/2013 |

\* cited by examiner

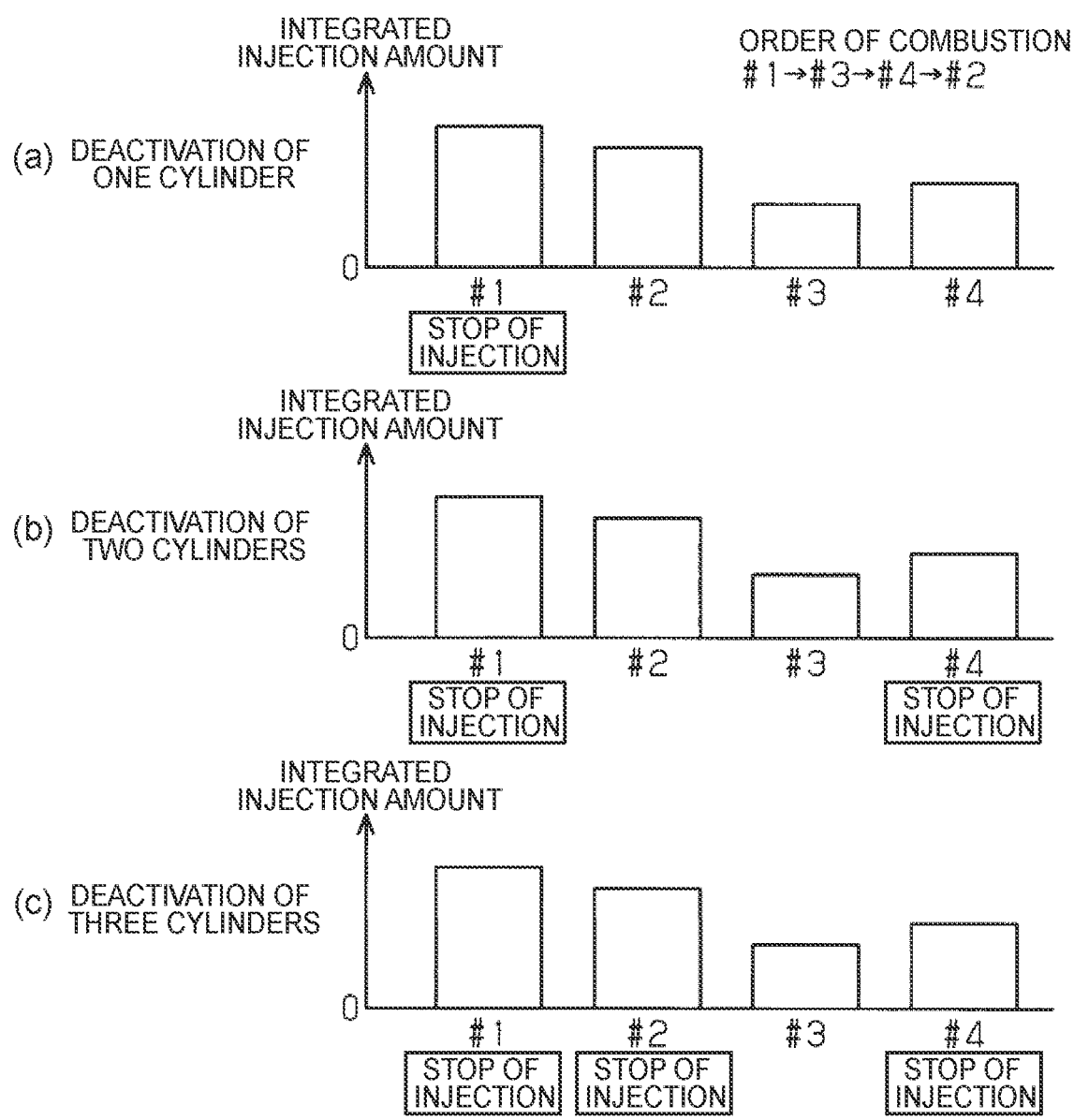

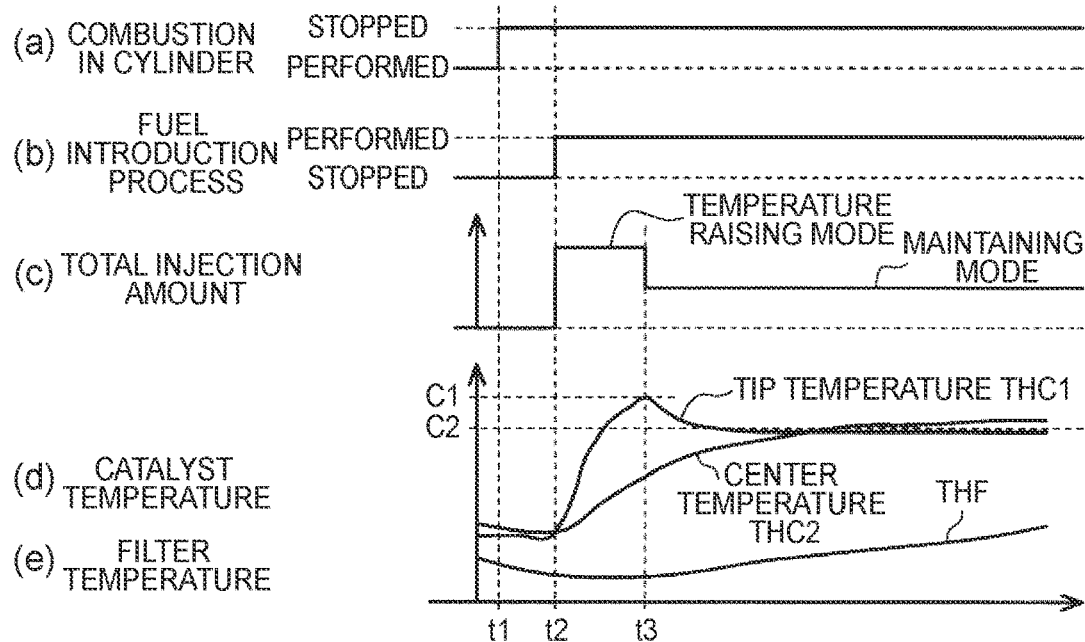
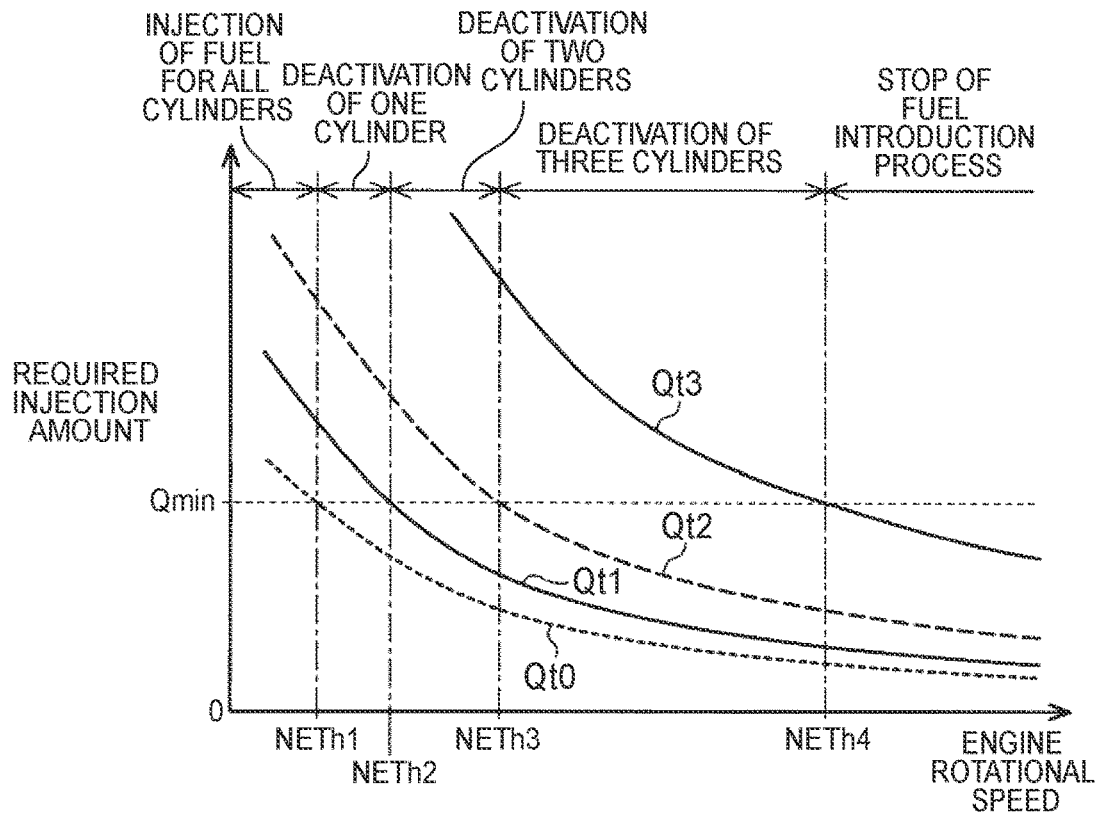

CONTROL APPARATUS FOR INTERNAL COMBUSTION ENGINE

INCORPORATION BY REFERENCE

The disclosure of Japanese Patent Application No. 2018-148053 filed on Aug. 7, 2018 including the specification, drawings and abstract is incorporated herein by reference in its entirety.

BACKGROUND

1. Technical Field

The disclosure relates to a control apparatus for an internal combustion engine, which is applied to a spark ignition internal combustion engine.

2. Description of Related Art

US Patent Application Publication No. 2014/0041362 describes an example of an internal combustion engine having an exhaust passage that is provided with a three-way catalyst. In the internal combustion engine described in US Patent Application Publication No. 2014/0041362, when the torque required of the internal combustion engine decreases through the cancellation of the operation of an accelerator or the like, the combustion in cylinders may be stopped. In such a combustion stop period, one of a fuel cut-off process and a fuel introduction process is selected. In the fuel cut-off process, fuel injection from fuel injection valves is stopped. In the fuel introduction process, the fuel injection valves are caused to inject fuel, and the fuel that remains unburned is caused to flow out from the cylinders to the exhaust passage.

In the case where the fuel introduction process is performed, the fuel injected from the fuel injection valves flows through the exhaust passage together with air. Then, when the fuel is introduced into the three-way catalyst, the temperature of the three-way catalyst rises due to the combustion of the fuel.

SUMMARY

In the fuel introduction process, in order to reduce the possibility that the temperature of the three-way catalyst is raised excessively due to the supply of an excessive amount of fuel, the amount of fuel injection is made smaller than that in the case where the air-fuel mixture containing fuel is burned in the cylinders. Therefore, the required injection amount per cylinder may become equal to or smaller than a minimum injection amount for each of the fuel injection valves. The minimum injection amount for each of the fuel injection valves in the present specification is a lower limit value of a range of the amount of fuel injection that is permitted to be used in each of the fuel injection valves, the range being set in design, as a range where the amount of injected fuel can be appropriately controlled. If fuel injection is performed with the required injection amount set as a target value when the required injection amount is equal to or smaller than the minimum injection amount, an amount of fuel corresponding to the minimum injection amount is actually injected, and an excessive amount of fuel resulting from the difference between the required injection amount and the minimum injection amount may be supplied to the three-way catalyst. Therefore, the temperature of the three-way catalyst may rise excessively.

An aspect of the disclosure relates to a control apparatus for an internal combustion engine including a plurality of cylinders; a plurality of fuel injection valves configured to supply fuel to the plurality of cylinders, respectively; an ignition device configured to perform spark discharge to burn, in the plurality of cylinders, an air-fuel mixture containing the fuel injected from the plurality of fuel injection valves; and a three-way catalyst that is provided in an exhaust passage. The control apparatus includes an electronic control unit configured to i) perform a fuel introduction process for causing the plurality of fuel injection valves to inject the fuel and causing the fuel that remains unburned to flow out from the plurality of cylinders to the exhaust passage, when combustion of the air-fuel mixture in the plurality of cylinders is stopped in a situation where a crankshaft of the internal combustion engine rotates, ii) calculate a total injection amount in the fuel introduction process, and control each of the plurality of fuel injection valves based on a required injection amount per cylinder that is obtained by dividing the total injection amount in accordance with the number of the fuel injection valves that inject the fuel, when the fuel introduction process is performed, and iii) perform a cylinder deactivation process for stopping the fuel from being injected for one or some of the plurality of cylinders, and controlling each of the plurality of fuel injection valves such that an amount of the fuel obtained by dividing the total injection amount is injected for a cylinder or cylinders other than the one or some of the plurality of cylinders for which the fuel is stopped from being injected, when the fuel introduction process is performed.

The required injection amount per cylinder is calculated by dividing the total injection amount in accordance with the number of fuel injection valves that inject the fuel. That is, the required injection amount per cylinder is more likely to become smaller than the minimum injection amount as the number of fuel injection valves that inject the fuel increases. In this respect, in the above-described configuration, the required injection amount per cylinder is increased in accordance with the number of cylinders for which the fuel is stopped from being injected, by performing the cylinder deactivation process. Therefore, the required injection amount per cylinder is unlikely to become smaller than the minimum injection amount, or the difference between the required injection amount per cylinder and the minimum injection amount is unlikely to become large even when the required injection amount per cylinder becomes smaller than the minimum injection amount. As a result, the three-way catalyst can be prevented from being supplied with an excessive amount of fuel, and the temperature of the three-way catalyst can be restrained from rising excessively.

In the above-described aspect, the electronic control unit may be configured to calculate the total injection amount such that the total injection amount decreases as an engine rotational speed of the internal combustion engine increases, when the fuel introduction process is performed.

When the engine rotational speed is high, the number of opportunities to perform fuel injection per unit time increases, and therefore, a larger amount of fuel is likely to reach the three-way catalyst per unit time. In order to restrain the temperature of the three-way catalyst from rising excessively, it is preferable to decrease the total injection amount as the engine rotational speed increases.

In the above-described aspect, the electronic control unit may be configured to increase the number of cylinders for which the fuel is stopped from being injected among the plurality of cylinders as the engine rotational speed increases, when the cylinder deactivation process is performed.

The required injection amount per cylinder is more likely to become smaller than the minimum injection amount as the total injection amount decreases. However, the required injection amount per cylinder can be increased in accordance with the number of cylinders for which the fuel is stopped from being injected, by increasing the number of cylinders for which the fuel is stopped from being injected as the engine rotational speed increases as in the above-described configuration. Thus, the required injection amount per cylinder is unlikely to become smaller than the minimum injection amount, or the difference between the required injection amount per cylinder and the minimum injection amount is unlikely to become large even when the required injection amount per cylinder becomes smaller than the minimum injection amount. As a result, the three-way catalyst can be prevented from being supplied with an excessive amount of fuel, and the temperature of the three-way catalyst can be restrained from rising excessively.

In the above-described aspect, the electronic control unit may be configured to calculate an integrated value of an injection amount in a period in which the fuel introduction process is performed, as an integrated injection amount, for each of the plurality of cylinders, and to stop the fuel from being injected for a cylinder having the integrated injection amount that is the largest among the integrated injection amounts of the plurality of cylinders, in the cylinder deactivation process.

In the cylinder deactivation process, the integrated injection amount varies among the cylinders, because the fuel is stopped from being injected for one or some of the cylinders. An amount of deposits in the cylinder having a large integrated injection amount is larger than that in the cylinder having a small integrated injection amount. In the above-described configuration, the cylinder or cylinders for which the fuel is stopped from being injected is/are determined based on the integrated injection amount, and thus, the cylinder or cylinders for which the fuel is stopped from being injected can be changed in every execution cycle of the fuel introduction process. Thus, it is possible to reduce the possibility that an amount of deposits in a specific one of the cylinders becomes large. Thus, the differences among the amounts of deposits in the cylinders can be reduced.

In the above-described aspect, the electronic control unit may be configured to determine cylinders for which the fuel is stopped from being injected such that the number of cylinders for which the fuel is stopped from being injected in succession in an order of undergoing an intake stroke until the plurality of cylinders undergo the intake stroke M times in succession becomes smaller than N, in a case where the number of the cylinders for which the fuel is stopped from being injected in the cylinder deactivation process is N, N is an integer equal to or larger than 2, the number of the plurality of cylinders of the internal combustion engine is M, and M is an integer larger than N.

When the fuel is stopped from being injected for one or some of the cylinders by performing the cylinder deactivation process, the distribution of the concentration of the fuel in the air-fuel mixture reaching the three-way catalyst in one cycle of the fuel introduction process becomes non-uniform as compared to the case where the cylinder deactivation process is not performed. That is, there is a period in which the air-fuel mixture with a lower concentration of fuel than a concentration of fuel in the case where fuel is not stopped from being injected for one or some of the cylinders in the fuel introduction process is introduced into the three-way catalyst. Then, when the period in which this air-fuel mixture with the low concentration of fuel is continuously introduced into the three-way catalyst becomes long, the temperature of the three-way catalyst falls, and it becomes difficult to maintain the temperature of the three-way catalyst at an appropriate temperature. In the above-described configuration, the fuel is not stopped from being injected for N or more cylinders in succession until the cylinders undergo an intake stroke M times in succession. Thus, the temperature of the three-way catalyst is restrained from falling, and it becomes easy to maintain the temperature of the three-way catalyst at an appropriate temperature.

In the above-described aspect, the electronic control unit may be configured to determine cylinders for which the fuel is stopped from being injected such that the cylinders for which the fuel is stopped from being injected do not undergo an intake stroke in succession, when the fuel is stopped from being injected for two or more of the plurality of cylinders in the cylinder deactivation process.

In the above-described configuration, the fuel is not successively stopped from being injected for the cylinders that undergo the intake stroke in succession. Therefore, the period, in which the air-fuel mixture with a lower concentration of fuel than a concentration of fuel in the case where the fuel is not stopped from being injected for one or some of the cylinders in the fuel introduction process is continuously introduced into the three-way catalyst, can be made as short as possible. Accordingly, the temperature of the three-way catalyst is restrained from falling, and it becomes easy to maintain the temperature of the three-way catalyst at an appropriate temperature.

In the above-described aspect, the electronic control unit may be configured to determine the number of cylinders for which the fuel is stopped from being injected such that the required injection amount does not become smaller than a minimum injection amount for each of the plurality of fuel injection valves, in the cylinder deactivation process.

In the above-described configuration, the required injection amount per cylinder does not become smaller than the minimum injection amount. Therefore, the temperature of the three-way catalyst can be restrained from rising excessively.

In the above-described aspect, the electronic control unit may be configured to determine the number of the cylinders for which the fuel is stopped from being injected such that the number of cylinders for which the fuel is injected is maximized on a condition that the required injection amount does not become smaller than the minimum injection amount, in the cylinder deactivation process.

In the above-described configuration, the number of cylinders for which the fuel is stopped from being injected by the cylinder deactivation process can be made as small as possible. Therefore, the distribution of the concentration of fuel in the air-fuel mixture reaching the three-way catalyst in one cycle of the fuel introduction process is unlikely to become non-uniform.

In the above-described aspect, the electronic control unit may be configured to stop all the plurality of fuel injection valves from injecting the fuel, without performing the fuel introduction process, when the total injection amount is smaller than a minimum injection amount for each of the plurality of fuel injection valves.

In the case where the total injection amount is smaller than the minimum injection amount, even when the fuel is injected for only one of the cylinders due to the cylinder deactivation process, the required injection amount per cylinder does not become larger than the minimum injection amount. In this case, the temperature of the three-way catalyst can be restrained from rising excessively, by refraining from performing the fuel introduction process.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 4 is a view showing the order of cylinders for which fuel is stopped from being injected in a cylinder deactivation process;

FIG. 5 is a timing chart in the case where a fuel introduction process is performed;

FIG. 6 is a view showing a relationship between a required injection amount and a minimum injection amount;

DETAILED DESCRIPTION OF EMBODIMENT

Figure 1:
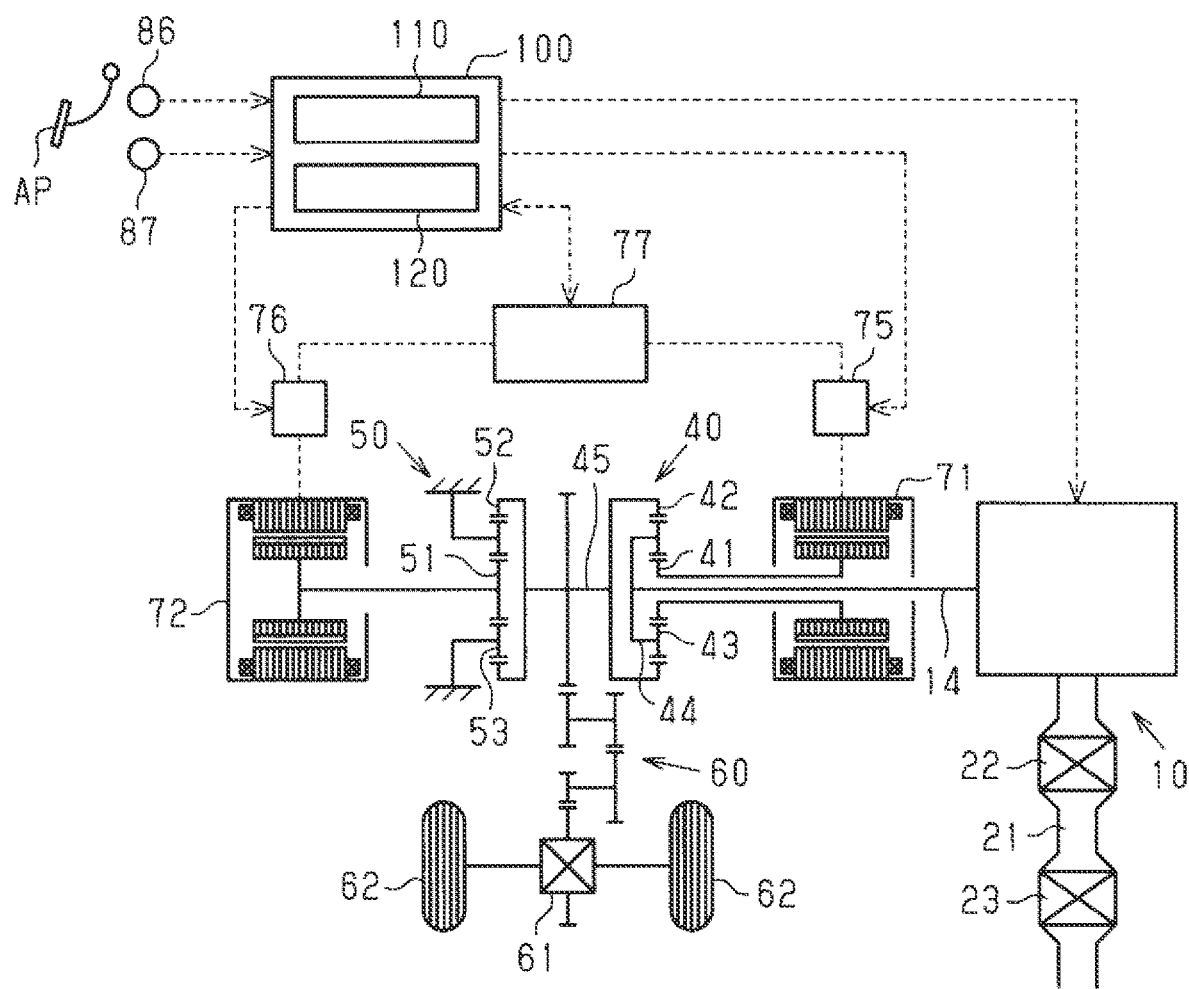
FIG. 1 is a configuration view showing the schematic configuration of a control apparatus including an internal combustion engine control unit as a control apparatus for an internal combustion engine according to an embodiment, and a hybrid vehicle that is provided with the control apparatus.

A control apparatus for an internal combustion engine according to an embodiment will be described hereinafter with reference to FIGS. 1 to 7. FIG. 1 shows the schematic configuration of a so-called hybrid vehicle that is provided with an internal combustion engine and a motor-generator as power sources for causing the vehicle to travel. As shown in FIG. 1, the hybrid vehicle includes an internal combustion engine 10, a power distribution integration mechanism 40 that is connected to a crankshaft 14 of the internal combustion engine 10, and a first motor-generator 71 that is connected to the power distribution integration mechanism 40. A second motor-generator 72 is coupled to the power distribution integration mechanism 40 via a reduction gear 50, and driving wheels 62 are coupled to the power distribution integration mechanism 40 via a deceleration mechanism 60 and a differential 61.

The power distribution integration mechanism 40 is a planetary gear mechanism, and includes a sun gear 41 as an external gear, and a ring gear 42 as an internal gear that is disposed coaxially with the sun gear 41. A plurality of pinion gears 43 that mesh with both the sun gear 41 and the ring gear 42 are arranged between the sun gear 41 and the ring gear 42. Each of the pinion gears 43 is supported by a carrier 44 so as to be rotatable around a rotation axis thereof and to be able to revolve around the sun gear 41. The first motor-generator 71 is coupled to the sun gear 41. The crankshaft 14 is coupled to the carrier 44. A ring gear shaft 45 is connected to the ring gear 42, and both the reduction gear 50 and the deceleration mechanism 60 are coupled to this ring gear shaft 45.

When an output of the internal combustion engine 10 is input to the carrier 44, this output is distributed to the sun gear 41-side and the ring gear 42-side. That is, the first motor-generator 71 can be caused to generate electric power by inputting the output of the internal combustion engine 10 to the first motor-generator 71.

On the other hand, in the case where the first motor-generator 71 is caused to function as an electric motor, an output of the first motor-generator 71 is input to the sun gear 41. Then, the output of the first motor-generator 71 input to the sun gear 41 is distributed to the carrier 44-side and the ring gear 42-side. Then, the output of the first motor-generator 71 is input to the crankshaft 14 via the carrier 44, and thus, the crankshaft 14 can be rotated. In the present embodiment, rotating the crankshaft 14 by driving the first motor-generator 71 in this manner will be referred to as "motoring".

The reduction gear 50 is a planetary gear mechanism, and includes a sun gear 51 as an external gear to which the second motor-generator 72 is coupled, and a ring gear 52 as an internal gear that is disposed coaxially with the sun gear 51. A ring gear shaft 45 is connected to the ring gear 52. A plurality of pinion gears 53 that mesh with both the sun gear 51 and the ring gear 52 are arranged between the sun gear 51 and the ring gear 52. Each of the pinion gears 53 is rotatable around a rotation axis thereof, but is not able to revolve around the sun gear 51.

Then, when the vehicle is decelerated, a regenerative braking force corresponding to an amount of electric power generated by the second motor-generator 72 can be generated in the vehicle by causing the second motor-generator 72 to function as a generator. In the case where the second motor-generator 72 is caused to function as an electric motor, an output of the second motor-generator 72 is input to the driving wheels 62 via the reduction gear 50, the ring gear shaft 45, the deceleration mechanism 60, and the differential 61. Thus, it becomes possible to rotate the driving wheels 62, namely, to cause the vehicle to travel.

The first motor-generator 71 exchanges electric power with a battery 77 via a first inverter 75. The second motor-generator 72 exchanges electric power with the battery 77 via a second inverter 76.

Figure 2:
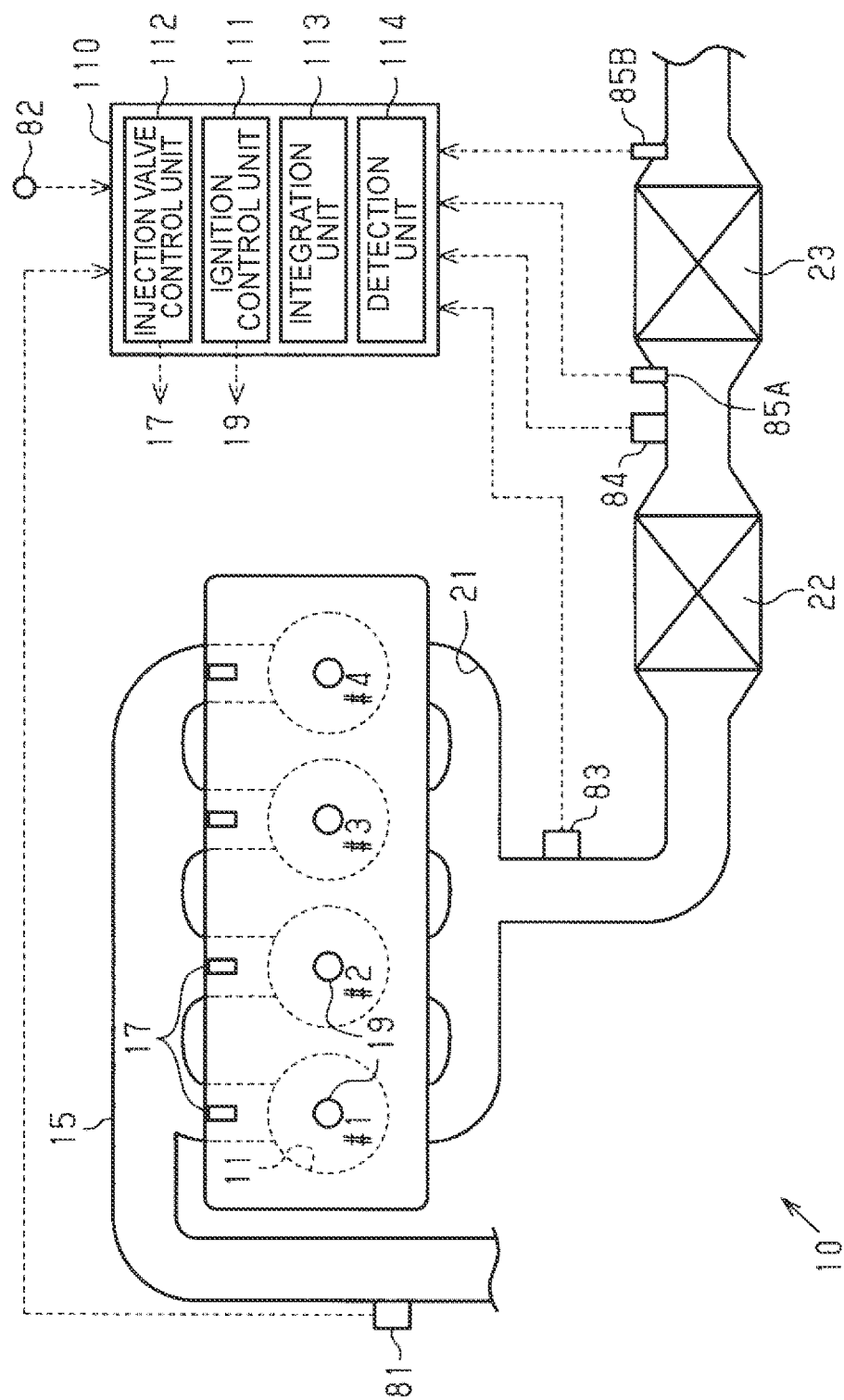
FIG. 2 is a view showing the functional configuration of the internal combustion engine control unit, and the schematic configuration of the internal combustion engine that is mounted in the hybrid vehicle.

As shown in FIG. 2, the internal combustion engine 10 is an inline four-cylinder internal combustion engine including four cylinders 11 that are arranged in an aligned manner. A piston that is coupled to the crankshaft 14 via a connecting rod is accommodated in each of the cylinders 11 such that the piston is able to reciprocate. In the internal combustion engine 10, the two pistons that are accommodated in the cylinders 11 whose cylinder numbers are "#1" and "#4" are coupled to the crankshaft 14 so as to reciprocate in synchronization with each other. Similarly, the two pistons that are accommodated in the cylinders 11 whose cylinder numbers "#2" and "#3" are coupled to the crankshaft 14 so as to reciprocate in synchronization with each other. That is, the cylinders 11 whose cylinder numbers are "#1" and "#4"

constitute a pair, and the cylinders 11 whose cylinder numbers are "#2" and "#3" constitute a pair.

Air is introduced into each of the cylinders 11 via the intake passage 15. The internal combustion engine 10 includes fuel injection valves 17 such that the number of the fuel injection valves 17 is the same as the number of the cylinders 11. Each of the fuel injection valves 17 is an injection valve that injects fuel into the intake passage 15. A range of the amount of fuel that is permitted to be used for injection is set for the fuel injection valves 17 in the design, as a range in which the amount of injected fuel can be appropriately controlled. A lower limit value of the range of the amount of fuel that is permitted to be used for injection will be referred to hereinafter as a minimum injection amount Q min. The fuel injected from each of the fuel injection valves 17 and air are introduced into the corresponding one of the cylinders 11 via the intake passage 15. Then, in each of the cylinders 11, an air-fuel mixture containing fuel and air burns through spark discharge of an ignition device 19.

In the internal combustion engine 10, combustion is repeatedly performed at intervals of 180° crank angle (CA) in the order in which the cylinder number shifts from "#1" to "#3", "#4", and "#2". In other words, an intake stroke in which air is introduced into each of the cylinders 11 is performed in the order of "#1", "#3", "#4", and "#2".

The internal combustion engine 10 includes an airflow meter 81 that detects an intake air amount GA. The airflow meter 81 is disposed in the intake passage 15. The internal combustion engine 10 includes a crank angle sensor 82 that detects a rotational angle of the crankshaft 14.

The exhaust gas produced in each of the cylinders 11 through the combustion of the air-fuel mixture is discharged to the exhaust passage 21. The exhaust passage 21 is provided with a three-way catalyst 22, and a particulate filter 23 that is disposed downstream of the three-way catalyst 22. The particulate filter 23 has a function of collecting particulate matter contained in the exhaust gas flowing through the exhaust passage 21.

An air-fuel ratio sensor 83 that detects a concentration of oxygen in the gas flowing through the exhaust passage 21, namely, an air-fuel ratio of the air-fuel mixture is disposed in the exhaust passage 21 at a position upstream of the three-way catalyst 22. An exhaust gas temperature sensor 84 that detects a temperature of the gas flowing through the exhaust passage 21 is disposed in the exhaust passage 21 at a position between the three-way catalyst 22 and the particulate filter 23. An upstream pressure sensor 85A that detects a pressure upstream of the particulate filter 23 is provided in the exhaust passage 21 at a position between the three-way catalyst 22 and the particulate filter 23. A downstream pressure sensor 85B that detects a pressure downstream of the particulate filter 23 is provided in the exhaust passage 21 at a position downstream of the particulate filter 23.

In the internal combustion engine 10, combustion of the air-fuel mixture in the cylinders 11 may be stopped when the vehicle travels and the crankshaft 14 rotates. A period in which the combustion of air-fuel mixture in the cylinders 11 is stopped with the crankshaft 14 rotating will be referred to as "a combustion stop period CSP". In the combustion stop period CSP, each of the pistons reciprocates in synchronization with rotation of the crankshaft 14. Therefore, the air introduced into each of the cylinders 11 via the intake passage 15 is caused to flow out to the exhaust passage 21, instead of being burned.

In the combustion stop period CSP, one of a fuel cut-off process and a fuel introduction process is selected and performed. In the fuel cut-off process, fuel injection from the fuel injection valves 17 is stopped. In the fuel introduction process, the fuel injection valves 17 are caused to inject fuel and the fuel that remains unburned is caused to flow out from the cylinders 11 to the exhaust passage 21. When the fuel introduction process is performed, the fuel injected from the fuel injection valves 17 flows through the exhaust passage 21 together with air. Then, the fuel is introduced into the three-way catalyst 22. When the temperature of the three-way catalyst 22 is equal to or higher than an activation temperature and the amount of oxygen in the three-way catalyst 22 is sufficient to burn the fuel, the fuel burns in the three-way catalyst 22. Thus, the temperature of the three-way catalyst 22 rises. Then, high-temperature gas flows into the particulate filter 23, and the temperature of the particulate filter 23 rises. Then, in the case where oxygen is supplied to the particulate filter 23, when the temperature of the particulate filter 23 becomes equal to or higher than a combustion enabling temperature, the particulate matter collected by the particulate filter 23 burns.

Next, the control configuration of the hybrid vehicle will be described with reference to FIGS. 1 and 2. As shown in FIG. 1, a control apparatus 100 for the hybrid vehicle calculates a required torque TQR as a torque to be output to the ring gear shaft 45, based on an accelerator operation amount ACC and a vehicle speed VS. The accelerator operation amount ACC is an operation amount of an accelerator pedal AP operated by a driver of the vehicle, and is a value detected by an accelerator operation amount sensor 86. The vehicle speed VS is a value corresponding to a moving speed of the vehicle, and is detected by a vehicle speed sensor 87. The control apparatus 100 controls the internal combustion engine 10 and the motor-generators 71 and 72, based on the calculated required torque TQR.

The control apparatus 100 includes an internal combustion engine control unit 110 that controls the internal combustion engine 10, and a motor control unit 120 that controls the motor-generators 71 and 72. The internal combustion engine control unit 110 is an example of "the control apparatus for the internal combustion engine" in the present embodiment. In the case where the fuel introduction process is performed in the combustion stop period CSP, the driving (i.e., operation) of the first motor-generator 71 is controlled to perform motoring, by the motor control unit 120. That is, the rotational speed of the crankshaft 14 in the combustion stop period CSP can be controlled by carrying out motoring. The internal combustion engine control unit 110 is an electronic control unit that includes a central processing unit (a CPU), a memory, input/output ports, and the like.

FIG. 2 shows the functional configuration of the internal combustion engine control unit 110. The internal combustion engine control unit 110 includes, as functional units, an ignition control unit 111 that controls the ignition device 19, an injection valve control unit 112 that controls the fuel injection valves 17, an integration unit 113, and a detection unit 114.

The detection unit 114 calculates parameters for controlling the vehicle and the internal combustion engine 10 based on detection signals from the various sensors. For example, the detection unit 114 calculates an intake air amount GA based on a detection signal from the airflow meter 81. The detection unit 114 detects a crank angle CA based on a detection signal from the crank angle sensor 82. Furthermore, the detection unit 114 calculates an engine rotational speed NE of the internal combustion engine 10 based on the crank angle CA. The detection unit 114 calculates an upstream pressure Pu based on a detection signal from the upstream pressure sensor 85A. The detection unit 114 calculates a downstream pressure Pd based on a detection signal from the downstream pressure sensor 85B.

The detection unit 114 estimates a tip temperature THC1 as a temperature of an upstream end portion of the three-way catalyst 22, based on an amount of fuel injected by performing the fuel introduction process. The temperature of the three-way catalyst 22 rises as the amount of fuel introduced into the three-way catalyst 22 per time increases. Therefore, the tip temperature THC1 can be estimated based on the amount of fuel injected per time by performing the fuel introduction process.

The detection unit 114 estimates a center temperature THC2 as a temperature of a central region of the three-way catalyst 22, based on the intake air amount GA and the tip temperature THC1 of the three-way catalyst 22 in the period in which the fuel introduction process is performed. As the tip temperature THC1 rises, the amount of heat transferred from the upstream end portion of the three-way catalyst 22 to the central region thereof increases, and therefore, the center temperature THC2 tends to be high. As the intake air amount GA increases, the rate of heat transfer from the upstream end portion of the three-way catalyst 22 to the central region thereof increases, and therefore, the center temperature THC2 tends to be high.

The detection unit 114 estimates a filter temperature THF as a temperature of the particulate filter 23, based on the center temperature THC2 of the three-way catalyst 22. The temperature of the particulate filter 23, which is disposed in the exhaust passage 21 at a position downstream of the three-way catalyst 22, can be estimated based on the center temperature THC2 of the three-way catalyst 22.

The ignition control unit 111 causes the ignition device 19 to perform spark discharge at a timing when each of the pistons reaches the vicinity of a compression top dead center, when the air-fuel mixture is burned in the corresponding one of the cylinders 11. On the other hand, the ignition control unit 111 does not cause the ignition device 19 to perform spark discharge, in the combustion stop period CSP.

The injection valve control unit 112 calculates a total injection amount Qb, as a total amount of fuel injected from the fuel injection valves 17 and introduced into the three-way catalyst 22 in one cycle of the fuel introduction process. One cycle of the fuel introduction process means a period in which the intake stroke is performed once in all the cylinders 11.

The amount of fuel injection required in the case where the fuel introduction process is performed is smaller than the amount of fuel injection required when the air-fuel mixture is burned in each of the cylinders 11. Therefore, in the case where fuel is introduced into each of the cylinders 11 in the fuel introduction process, the air-fuel ratio in the cylinder 11 is leaner than an air-fuel ratio when the air-fuel mixture is burned in the cylinder 11 (e.g., a theoretical air-fuel ratio).

The total injection amount Qb is calculated as follows. A base value is calculated based on the intake air amount GA such that the air-fuel ratio of the air-fuel mixture flowing through the exhaust passage 21 approaches a target value. This basic value is corrected such that the total injection amount Qb decreases as the engine rotational speed NE increases. Thus, the total injection amount Qb is calculated. It should be noted herein that the air-fuel mixture in the exhaust passage 21 may burn if the air-fuel ratio of the air-fuel mixture flowing through the exhaust passage 21 becomes a rich value due to the fuel introduction process. Therefore, the target values of the air-fuel ratio of the air-fuel mixture used to calculate the total injection amount Qb are set as values for restraining the air-fuel mixture from burning in the exhaust passage 21. A relationship between the engine rotational speed NE and the total injection amount Qb will be described later. A first target air-fuel ratio AF1, and a second target air-fuel ratio AF2 as a value leaner than the first target air-fuel ratio AF1 are set as the target values of the air-fuel ratio of the air-fuel mixture during the fuel introduction process.

In the fuel introduction process, in a temperature raising mode for raising the tip temperature THC1 of the three-way catalyst 22 to a first temperature C1, the base value of the total injection amount Qb is calculated with the first target air-fuel ratio AF1 set as the target value of the air-fuel ratio of the air-fuel mixture. In the fuel introduction process, in a maintaining mode for maintaining the tip temperature THC1 of the three-way catalyst 22 at a value equal to a second temperature C2 that is lower than the first temperature C1, the base value of the total injection amount Qb is calculated with the second target air-fuel ratio AF2 set as the target value of the air-fuel ratio of the air-fuel mixture. In the fuel introduction process, a transition from the temperature raising mode to the maintaining mode is made when the tip temperature THC1 of the three-way catalyst 22 reaches the first temperature C1.

The injection valve control unit 112 sets a target value of the amount of fuel injected from the fuel injection valve 17 provided in each of the cylinders 11, by dividing the total injection amount Qb based on the number of cylinders 11 for which fuel is injected. For example, in the case where fuel injection for the cylinders 11 is not stopped by a cylinder deactivation process that will be described later, the injection valve control unit 112 calculates a required injection amount Qt0 (=Qb/4) obtained by equally distributing the total injection amount Qb to the four cylinders 11, as a target value of the amount of fuel injection for controlling each of the fuel injection valves 17. That is, the required injection amount Qt0 is used as the required injection amount per cylinder. The act of controlling each of the fuel injection valves 17 with the required injection amount Qt0 set as the required injection amount per cylinder so as to perform the injection of fuel for all the cylinders 11 will be referred to hereinafter as "all-cylinder injection".

The integration unit 113 calculates an integrated value of the amount of fuel injected from each of the fuel injection valves 17 to a corresponding one of the cylinders 11. The integration unit 113 stores, as integrated injection amounts Qac, the calculated integrated values that correspond to the cylinders 11, respectively. Each of the integrated injection amounts Qac is calculated as an integrated value of the amount of fuel injection (i.e., an integrated value of an injection amount) in the period in which the fuel introduction process is performed.

Next, the stop of the combustion of the air-fuel mixture in the cylinders 11, the fuel introduction process that is performed in the combustion stop period CSP in which combustion is stopped, and the cylinder deactivation process that is performed when performing the fuel introduction process will be described as processes that are performed by the internal combustion engine control unit 110.

Condition for Stopping Combustion

The combustion of the air-fuel mixture in the cylinders 11 is stopped or restarted depending on whether a condition for stopping combustion is fulfilled. When a transition from a state where the stop condition is not fulfilled to a state where the stop condition is fulfilled is made, the internal combustion engine control unit 110 requires the stop of combustion of the air-fuel mixture in the cylinders 11. In this case, the ignition control unit 111 stops spark discharge performed by the ignition device 19. When a transition from a state where the stop condition is fulfilled to a state where the stop condition is not fulfilled is made, the internal combustion engine control unit 110 requires the restart of combustion of the air-fuel mixture in the cylinders 11. In this case, the ignition control unit 111 restarts spark discharge performed by the ignition device 19. That is, the combustion stop period CSP is a period from a timing when a transition from the state where the stop condition is not fulfilled to the state where the stop condition is fulfilled is made, to a timing when a transition from the state where the stop condition is fulfilled to the state where the stop condition is not fulfilled is made.

It is determined that the condition for stopping combustion is fulfilled, for example, when the required value of the output of the internal combustion engine 10 is equal to or smaller than "0". In this case, it is not determined that the condition for stopping combustion is fulfilled, when the required value of the output of the internal combustion engine 10 is larger than "0".

Fuel Introduction Process

The fuel introduction process that is performed in the combustion stop period CSP will be described. When the following conditions, namely, (Condition 1) and (Condition 2) are fulfilled in the combustion stop period CSP, it is determined that a condition for performing the fuel introduction process is fulfilled. On the other hand, when at least one of (Condition 1) and (Condition 2) is not fulfilled after the start of the combustion stop period CSP, the fuel cut-off process is performed. (Condition 1) is a condition that it can be determined that the temperature of the three-way catalyst 22 is equal to or higher than a prescribed temperature. (Condition 2) is a condition that the estimated value of the collection amount of particulate matter in the particulate filter 23 (i.e., the estimated value of the amount of particulate matter collected in the particulate filter 23) is equal to or larger than a determination collection amount.

Even in the case where unburned fuel is introduced into the three-way catalyst 22, when the temperature of the three-way catalyst 22 is low, the fuel cannot be burned in some cases. Thus, the prescribed temperature is set as a criterion for determining whether the unburned fuel introduced into the three-way catalyst 22 can be burned. That is, the prescribed temperature is set to be equal to the activation temperature of the three-way catalyst 22 or a temperature that is slightly higher than the activation temperature. The center temperature THC2 can be used as the temperature of the three-way catalyst 22.

The clogging of the particulate filter 23 progresses as the collection amount of particulate matter in the particulate filter 23 increases. Thus, the determination collection amount is set as a criterion for determining whether the clogging of the particulate filter 23 has progressed to such an extent that the particulate filter 23 needs to be regenerated. When the collection amount increases, the difference between the pressure in a region of the exhaust passage 21 located between the three-way catalyst 22 and the particulate filter 23 and the pressure in a region of the exhaust passage 21 located downstream of the particulate filter 23 tends to be large. Thus, the estimated value of the collection amount can be calculated based on, for example, a differential pressure obtained by subtracting the downstream pressure Pd from the upstream pressure Pu.

Cylinder Deactivation Process

The cylinder deactivation process is performed by the injection valve control unit 112 when the fuel introduction process is performed. In the cylinder deactivation process, in the case where fuel is stopped from being injected for one or some of the cylinders 11, the required injection amount per cylinder is recalculated. A cylinder selection method that will be described later determines the cylinder 11 or cylinders 11 for which fuel is stopped from being injected in the cylinder deactivation process.

In the case where fuel is stopped from being injected for one of the cylinders 11 in the internal combustion engine 10, the total injection amount Qb is distributed to the other three cylinders 11. In this case, a target value for controlling the fuel injection valves 17 is set as a one-cylinder-stop injection amount Qt1 (=Qb/3). The act of stopping fuel from being injected for one of the cylinders 11 and controlling the fuel injection valves 17 with the one-cylinder-stop injection amount Qt1 set as the required injection amount per cylinder will be referred to as "three-cylinder injection".

In the case where fuel is stopped from being injected for two of the cylinders 11, the total injection amount Qb is equally distributed to the other two cylinders 11. In this case, the target value for controlling the fuel injection valves 17 is set as a two-cylinder-stop injection amount Qt2 (=Qb/2). The act of stopping fuel from being injected for two of the cylinders 11 and controlling the fuel injection valves 17 with the two-cylinder-stop injection amount Qt2 set as the required injection amount per cylinder will be referred to as "two-cylinder injection".

In the case where fuel is stopped from being injected for three of the cylinders 11, the total injection amount Qb is set as a three-cylinder-stop injection amount Qt3. In this case, the three-cylinder-stop injection amount Qt3 is set as the target value for controlling the fuel injection valves 17. The act of stopping fuel from being injected for three of the cylinders 11 and controlling the fuel injection valves 17 with the three-cylinder-stop injection amount Qt3 set as the required injection amount per cylinder will be referred to as "one-cylinder injection".

A series of processes concerning the control of the fuel injection valves 17 in the combustion stop period will be described with reference to FIG. 3. This series of processes is performed by the injection valve control unit 112. This series of processes is repeatedly performed when the above-described (Condition 1) and (Condition 2) are fulfilled in the combustion stop period.

When this series of processes is started, it is first determined in step S101 whether the required injection amount Qt0 is larger than the minimum injection amount Q min. If the required injection amount Qt0 is larger than the minimum injection amount Q min (YES in S101), the processing is shifted to step S102. In step S102, a request to perform all-cylinder injection is made such that fuel is injected for all the cylinders 11. That is, the fuel introduction process is performed in this case. After that, the series of processes is ended.

On the other hand, if the minimum injection amount Q min is equal to or larger than the required injection amount Qt0 (NO in S101), the processing is shifted to step S103. In step S103, the one-cylinder-stop injection amount Qt1 is computed, and it is determined whether the one-cylinder-stop injection amount Qt1 is larger than the minimum injection amount Q min. If the one-cylinder-stop injection amount Qt1 is larger than the minimum injection amount Q min (YES in S103), the processing is shifted to step S104. In step S104, one of the cylinders 11 is selected according to the cylinder selection method, and a request to perform three-cylinder injection by stopping fuel from being injected for the selected cylinder 11 is made. That is, the fuel introduction process is performed in combination with the cylinder deactivation process. After that, the series of processes is ended.

On the other hand, if the minimum injection amount Q min is equal to or larger than the one-cylinder-stop injection amount Qt1 (NO in S103), the processing is shifted to step S105. In step S105, the two-cylinder-stop injection amount Qt2 is computed, and it is determined whether the two-cylinder-stop injection amount Qt2 is larger than the minimum injection amount Q min. If the two-cylinder-stop injection amount Qt2 is larger than the minimum injection amount Q min (YES in S105), the processing is shifted to step S106. In step S106, two of the cylinders 11 are selected according to the cylinder selection method, and a request to perform two-cylinder injection by stopping fuel from being injected for the selected two cylinders 11 is made. That is, the fuel introduction process is performed in combination with the cylinder deactivation process. After that, the series of processes is ended.

On the other hand, if the minimum injection amount Q min is equal to or larger than the two-cylinder-stop injection amount Qt2 (NO in S105), the processing is shifted to step S107. In step S107, the three-cylinder-stop injection amount Qt3 is computed, and it is determined whether the three-cylinder-stop injection amount Qt3 is larger than the minimum injection amount Q min. If the three-cylinder-stop injection amount Qt3 is larger than the minimum injection amount Q min (YES in S107), the processing is shifted to step S108. In step S108, three of the cylinders 11 are selected according to the cylinder selection method, and a request to perform one-cylinder injection by stopping fuel from being injected for the selected three cylinders 11 is made. That is, the fuel introduction process is performed in combination with the cylinder deactivation process. After that, the series of processes is ended.

On the other hand, if the minimum injection amount Q min is equal to or larger than the three-cylinder-stop injection amount Qt3 (NO in S105), the processing is shifted to step S109. In step S109, a request to stop fuel from being injected for all the four cylinders 11 is made. That is, the fuel cut-off process is performed without performing the fuel introduction process. After that, the series of processes is ended.

The cylinder selection method for selecting the cylinder or cylinders for which fuel is stopped from being injected in the cylinder deactivation process will be described with reference to FIG. 4. In the cylinder selection method, an integrated injection amount Qac that is stored in the integration unit 113 and that corresponds to each of the cylinders 11 is used. FIG. 4 shows an example in which the integrated injection amount Qac decreases in the order of "#1", "#2", "#4", and "#3" (i.e., the integrated injection amount Qac of the cylinder with the cylinder number #1 is the largest, and the integrated injection amount Qac of the cylinder with the cylinder number #3 is the smallest).

As indicated by (a) in FIG. 4, in the case where fuel is stopped from being injected for one of the cylinders 11, the cylinder 11 with the largest integrated injection amount Qac is selected, and fuel is stopped from being injected for the selected cylinder 11. That is, in the example shown in FIG. 4, the cylinder 11 whose cylinder number is "#1" is selected.

As indicated by (b) in FIG. 4, in the case where fuel is stopped from being injected for two of the cylinders 11, the cylinder 11 with the largest integrated injection amount Qac is first selected. Then, the one of the cylinders 11, in which the intake stroke is not performed in succession to the intake stroke in the cylinder 11 with the largest integrated injection amount Qac in the order of combustion, namely, the order in which the intake stroke is performed (i.e., the order of undergoing the intake stroke), is selected. That is, in the example shown in FIG. 4, the cylinders 11 whose cylinder numbers are "#1" and "#4" are selected, and fuel is stopped from being injected for the selected cylinders 11. In other words, the cylinder 11 with the largest integrated injection amount Qac and the cylinder 11 that forms a pair with this cylinder 11 are selected.

As indicated by (c) in FIG. 4, in the case where fuel is stopped from being injected for three of the cylinders 11, the cylinder 11 with the largest integrated injection amount Qac as indicated by (b) in FIG. 4 and the cylinder 11 that forms a pair with this cylinder 11 are first selected. Subsequently, the cylinder 11 with the largest integrated injection amount Qac is selected from the unselected cylinders 11. That is, in the example shown in FIG. 4, the cylinder 11 whose cylinder number is "#2" is selected in addition to the cylinders 11 whose cylinder numbers are "#1" and "#4", and fuel is stopped from being injected for the selected cylinders 11.

The operation and effect of the present embodiment will be described. The amount of fuel injection in the case where the fuel introduction process is performed will be described with reference to FIG. 5. FIG. 5 shows an example in which a condition for stopping combustion is fulfilled at a timing t1, and a condition for performing the fuel introduction process is fulfilled at a timing t2.

As indicated by (a) in FIG. 5, the combustion of the air-fuel mixture in the cylinders 11 is stopped at and after the timing t1 when the condition for stopping combustion is fulfilled. In a period from the timing t1 to the timing t2, the condition for performing the fuel introduction process is not fulfilled, and thus, the fuel cut-off process is performed. As indicated by (b) in FIG. 5, the fuel introduction process is performed at and after the timing t2 when the condition for performing the fuel introduction process is fulfilled. As the mode of performing the fuel introduction process, the temperature raising mode is selected, and the total injection amount Qb is calculated.

Fuel is introduced into the three-way catalyst 22 at and after the timing t2 when the fuel introduction process is performed. Thus, as indicated by (d) in FIG. 5, the tip temperature THC1 of the three-way catalyst 22 starts rising at and after the timing t2. When the tip temperature THC1 of the three-way catalyst 22 reaches the first temperature C1 at a timing t3, the mode of performing the fuel introduction process is shifted to the maintaining mode. That is, the total injection amount Qb is reduced as indicated by (c) in FIG. 5 such that the tip temperature THC1 indicated by (d) in FIG. 5 is maintained to be equal to a second temperature C2, at and after the timing t3.

As indicated by (d) in FIG. 5, the center temperature THC2 of the three-way catalyst 22 rises as the tip temperature THC1 thereof rises. When the tip temperature THC1 and the center temperature THC2 rise, the filter temperature THF indicated by (e) in FIG. 5 rises afterward. Thus, by performing the fuel introduction process, the filter temperature THF can be raised, and the particulate filter 23 can be regenerated.

It should be noted herein that the total injection amount Qb decreases when the fuel introduction process is shifted from the temperature raising mode to the maintaining mode at and after the timing t3. Consequently, the required injection amount per cylinder also decreases. That is, the required injection amount per cylinder may become equal to or smaller than the minimum injection amount Q min. In this respect, according to the present embodiment, it is possible to avoid the situation where the required injection amount per cylinder is equal to or smaller than the minimum injection amount Q min by performing the cylinder deactivation process to stop fuel from being injected for one or some of the cylinders in the fuel introduction process. That is, the required injection amount per cylinder can be restrained from becoming equal to or smaller than the minimum injection amount Q min, and thus, the three-way catalyst 22 can be prevented from being supplied with an excessive amount of fuel, and the temperature of the three-way catalyst 22 can be restrained from rising excessively.

The amount of fuel injection required for performing the fuel introduction process is smaller than the amount of fuel injection required for burning the air-fuel mixture in the cylinders 11. Therefore, even in the case where the fuel introduction process is performed in the temperature raising mode, the required injection amount per cylinder is likely to become equal to or smaller than the minimum injection amount Q min, although the total injection amount Qb is larger than that in the case where the maintaining mode is selected. According to the present embodiment, even in the temperature raising mode, the required injection amount per cylinder can be restrained from becoming equal to or smaller than the minimum injection amount Q min, by performing the cylinder deactivation process.

Next, the required injection amount per cylinder that is increased by performing the cylinder deactivation process will be described with reference to FIG. 6. FIG. 6 shows a relationship between the required injection amount per cylinder and the engine rotational speed NE. FIG. 6 shows an example case where the target value of the air-fuel ratio of the air-fuel mixture flowing through the exhaust passage 21 and the intake air amount GA are constant.

The total injection amount Qb is calculated such that the total injection amount Qb decreases as the engine rotational speed NE increases. Therefore, the required injection amount per cylinder obtained by dividing the total injection amount Qb also decreases as the engine rotational speed NE increases. That is, the required injection amount per cylinder is likely to become equal to or smaller than the minimum injection amount Q min as the engine rotational speed NE increases.

In this respect, according to the present embodiment, the required injection amount per cylinder can be restrained from becoming equal to or smaller than the minimum injection amount Q min. More specifically, in a region where the engine rotational speed NE is lower than a first threshold NETh1, the required injection amount Qt0 is larger than the minimum injection amount Q min. Therefore, all-cylinder injection is performed based on the determination made in step S101 of FIG. 3 (S102).

In a region where the engine rotational speed NE is equal to or higher than the first threshold NETh1 and lower than a second threshold NETh2, the required injection amount Qt0 is equal to or smaller than the minimum injection amount Q min. However, the one-cylinder-stop injection amount Qt1 is larger than the minimum injection amount Q min. Therefore, three-cylinder injection is performed by stopping fuel from being injected for one of the cylinders, based on the determination made in step S103 (S104).

In a region where the engine rotational speed NE is equal to or higher than the second threshold NETh2 and lower than a third threshold NETh3, the two-cylinder-stop injection amount Qt2 is larger than the minimum injection amount Q min. Therefore, two-cylinder injection is performed by stopping fuel from being injected for two of the cylinders, based on the determination made in step S105 (S106).

In a region where the engine rotational speed NE is equal to or higher than the third threshold NETh3 and lower than a fourth threshold NETh4, the three-cylinder-stop injection amount Qt3 is larger than the minimum injection amount Q min. Therefore, one-cylinder injection is performed by stopping fuel from being injected for three of the cylinders, based on the determination made in step S107 (S108).

The injection amount in one or some of the cylinders 11 for which fuel is stopped from being injected is distributed to the other cylinders or cylinder for which fuel is not stopped from being injected, through the cylinder deactivation process. Therefore, when the required injection amount per cylinder is smaller than the minimum injection amount, the required injection amount per cylinder can be increased. Thus, the required injection amount per cylinder can be restrained from becoming equal to or smaller than the minimum injection amount Q min. Therefore, the three-way catalyst 22 can be prevented from being supplied with an excessive amount of fuel, and the temperature of the three-way catalyst 22 can be restrained from rising excessively.

According to the present embodiment, the number of cylinders 11 for which fuel is stopped from being injected is made as small as possible through the cylinder deactivation process. Thus, the required injection amount per cylinder can be increased while performing the injection of fuel for as many cylinders 11 as possible.

Furthermore, as shown in FIG. 6, in a region where the engine rotational speed NE is equal to or higher than the fourth threshold NETh4, the three-cylinder-stop injection amount Qt3 is equal to or smaller than the minimum injection amount Q min. Therefore, fuel injection is stopped based on the determination made in step S107 (S109). In the case where the three-cylinder-stop injection amount Qt3 as the required injection amount in one-cylinder injection is equal to or smaller than the minimum injection amount Q min, the fuel cut-off process is performed, and thus, the temperature of the three-way catalyst 22 is prevented from being raised excessively by performing the fuel introduction process.

In the cylinder deactivation process, fuel is stopped from being injected for one or some of the cylinders 11, and thus, the integrated injection amount Qac varies among the cylinders 11. An amount of deposits in the cylinder 11 having a large integrated injection amount Qac is larger than that in the cylinder 11 having a small integrated injection amount Qac. According to the present embodiment, the cylinder 11 or cylinders 11 for which fuel is stopped from being injected is/are determined based on the integrated injection amount Qac as shown in FIG. 4. Therefore, the cylinder 11 or cylinders 11 for which fuel is stopped from being injected can be changed in every execution cycle of the fuel introduction process. Thus, it is possible to reduce the possibility that the amount of deposits in a specific one of the cylinders becomes large. Thus, the differences among the amounts of deposits in the cylinders 11 can be reduced.

When fuel is stopped from being injected for one or some of the cylinders by performing the cylinder deactivation process, the distribution of the concentration of fuel in the air-fuel mixture reaching the three-way catalyst 22 in one cycle of the fuel introduction process becomes non-uniform. That is, there is a period in which the air-fuel mixture with a lower concentration of fuel than a concentration of fuel in the case where fuel is not stopped from being injected for one or some of the cylinders in the fuel introduction process is introduced into the three-way catalyst 22. If fuel is stopped from being injected for a plurality of cylinders that undergo the intake stroke in succession, the period in which the air-fuel mixture with a low concentration of fuel is continuously introduced into the three-way catalyst 22 becomes long. As a result, it becomes difficult to control the temperature of the three-way catalyst 22. In this case, according to the present embodiment, in the case where fuel is stopped from being injected for two of the cylinders 11, the cylinders 11 for which fuel is stopped from being injected are selected such that the selected cylinders 11 do not undergo the intake stroke in succession.

Figure 7:
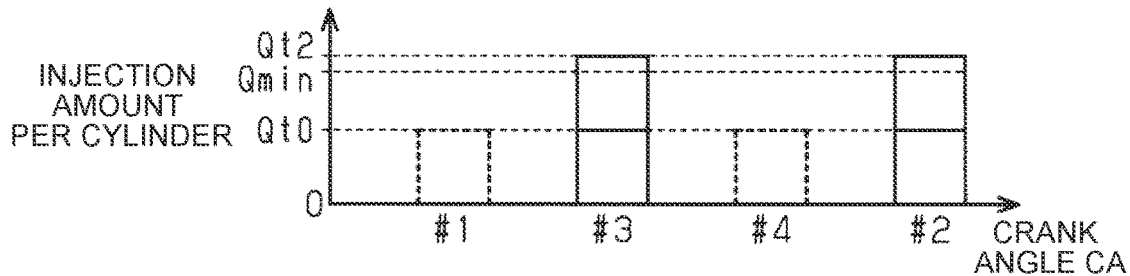
FIG. 7 is a view showing a manner of fuel injection for each of the cylinders in the case where the cylinder deactivation process is performed.

FIG. 7 shows an example case where two-cylinder injection is performed by performing the cylinder deactivation process. Each broken line in the drawing indicates an injection amount per cylinder before stopping fuel from being injected by the cylinder deactivation process. In this example, the required injection amount Qt0 as the required injection amount per cylinder in all-cylinder injection is smaller than the minimum injection amount Q min. However, fuel is stopped from being injected for two of the cylinders 11 by the cylinder deactivation process, and the two-cylinder-stop injection amount Qt2 as the required injection amount per cylinder in two-cylinder injection thereby becomes larger than the minimum injection amount Q min. The cylinders 11 whose cylinder numbers are "#1" and "#4", namely, the two cylinders 11 that do not undergo the intake stroke in succession are selected according to the cylinder selection method, as the two cylinders 11 for which fuel is stopped from being injected. That is, in the example shown in FIG. 7, the discharge of air from the cylinders 11 for which fuel is stopped from being injected and the discharge of the air-fuel mixture from the cylinders 11 for which fuel is injected are alternately performed. Thus, the distribution of the concentration of fuel in the air-fuel mixture reaching the three-way catalyst 22 can be restrained from becoming non-uniform in one cycle of the fuel introduction process. As described hitherto, the cylinders 11 for which fuel is stopped from being injected are determined such that the determined (selected) cylinders 11 do not undergo the intake stroke in succession. Thus, it is possible to reduce the possibility that the air-fuel mixture with a relatively high concentration is continuously introduced into the three-way catalyst 22 due to non-uniformity of the concentration. Therefore, the temperature of the three-way catalyst 22 can be restrained from rising excessively.

In the case where the cylinders 11 for which fuel is stopped from being injected are determined such that the discharge of air from the cylinders 11 for which fuel is stopped from being injected and the discharge of the air-fuel mixture from the cylinders 11 for which fuel is injected are alternately performed as in the example shown in FIG. 7, the distribution of the concentration of fuel in the air-fuel mixture reaching the three-way catalyst 22 can be restrained from becoming non-uniform, even when one cycle of the fuel introduction process is repeated a plurality of times.

The present embodiment can be implemented after being modified as follows. The present embodiment and the following modification examples can be implemented in combination with each other within a range in which there is no technical contradiction. The procedure of controlling the fuel injection valves 17 in the combustion stop period is not limited to the processing procedure as shown in FIG. 3. For example, the engine rotational speed NE and the required injection amount per cylinder are correlated with each other as shown in FIG. 6. That is, the series of processes concerning the control of the fuel injection valves 17 in the combustion stop period can be also performed through the use of first to fourth determination rotational speeds NEA1 to NEA4 (NEA1<NEA2<NEA3<NEA4), instead of comparing the minimum injection amount Q min and the required injection amount per cylinder with each other as in the above-described series of processes.

Figure 8:
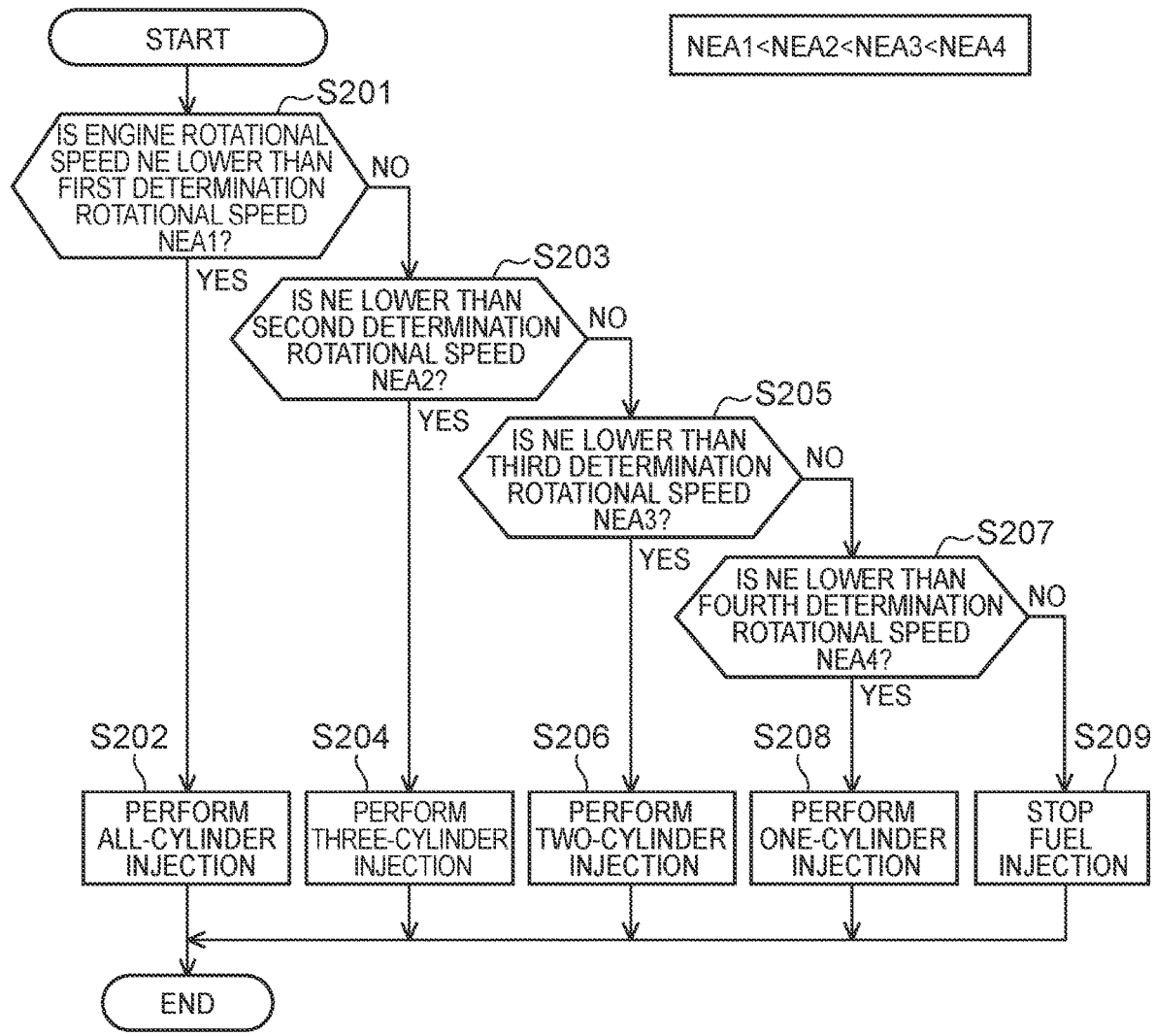
FIG. 8 is a flowchart showing the flow of a process that is performed by an internal combustion engine control unit according to a modification example.

The series of processes concerning the control of the fuel injection valves 17 in the combustion stop period will be described with reference to FIG. 8. The injection valve control unit 112 performs this series of processes. This series of processes is repeatedly performed when the above-described (Condition 1) and (Condition 2) are fulfilled in the combustion stop period.

When this series of processes is started, it is determined first in step S201 whether the engine rotational speed NE is lower than the first determination rotational speed NEA1. If the engine rotational speed NE is lower than the first determination rotational speed NEA1 (YES in S201), the processing is shifted to step S202. In step S202, a request to perform all-cylinder injection is made such that fuel is injected for all the cylinders 11. That is, the fuel introduction process is performed. After that, the series of processes is ended.

If the engine rotational speed NE is equal to or higher than the first determination rotational speed NEA1 (NO in S201), the processing is shifted to step S203. In step S203, it is determined whether the engine rotational speed NE is lower than the second determination rotational speed NEA2. The second determination rotational speed NEA2 is higher than the first determination rotational speed NEA1. If the engine rotational speed NE is lower than the second determination rotational speed NEA2 (YES in S203), the processing is shifted to step S204. In step S204, one of the cylinders 11 is selected according to the cylinder selection method, and a request to perform three-cylinder injection by stopping fuel from being injected for the cylinder 11 selected from the four cylinders 11 is made. That is, the fuel introduction process is performed in combination with the cylinder deactivation process. After that, the series of processes is ended.

If the engine rotational speed NE is equal to or higher than the second determination rotational speed NEA2 (NO in S203), the processing is shifted to step S205. In step S205, it is determined whether the engine rotational speed NE is lower than the third determination rotational speed NEA3. The third determination rotational speed NEA3 is higher than the second determination rotational speed NEA2. If the engine rotational speed NE is lower than the third determination rotational speed NEA3 (YES in S205), the processing is shifted to step S206. In step S206, two of the cylinders 11 are selected according to the cylinder selection method, and a request to perform two-cylinder injection by stopping fuel from being injected for the two cylinders 11 selected from the four cylinders 11 is made. That is, the fuel introduction process is performed in combination with the cylinder deactivation process. After that, the series of processes is ended.

If the engine rotational speed NE is equal to or higher than the third determination rotational speed NEA3 (NO in S205), the processing is shifted to step S207. In step S207, it is determined whether the engine rotational speed NE is lower than the fourth determination rotational speed NEA4. The fourth determination rotational speed NEA4 is higher than the third determination rotational speed NEA3. If the engine rotational speed NE is lower than the fourth determination rotational speed NEA4 (YES in S207), the processing is shifted to step S208. In step S208, three of the cylinders 11 are selected according to the cylinder selection method, and a request to perform one-cylinder injection by stopping fuel from being injected for the three cylinders 11 selected from the four cylinders 11 is made. That is, the fuel introduction process is performed in combination with the cylinder deactivation process. After that, the series of processes is ended.

If the engine rotational speed NE is equal to or higher than the fourth determination rotational speed NEA4 (NO in S205), the processing is shifted to step S209. In step S209, a request to stop fuel from being injected for all the four cylinders 11 is made. That is, the fuel cut-off process is performed without performing the fuel introduction process. After that, the series of processes is ended.

When the engine rotational speed NE is high, the number of opportunities to perform fuel injection per unit time increases, and therefore, a larger amount of fuel is likely to reach the three-way catalyst 22 per unit time. In order to restrain the amount of fuel reaching the three-way catalyst 22 per unit time from increasing, the total injection amount Qb is calculated so as to decrease as the engine rotational speed NE increases. Thus, the temperature of the three-way catalyst 22 is restrained from rising excessively. Then, as shown in FIG. 6, the required injection amount per cylinder calculated by dividing the total injection amount Qb decreases as the engine rotational speed NE increases. In the above-described configuration, the cylinder deactivation process is performed when the engine rotational speed NE is high and the required injection amount per cylinder is small. Thus, the required injection amount per cylinder can be increased in accordance with the number of cylinders 11 for which fuel is stopped from being injected. Accordingly, the required injection amount per cylinder can be made unlikely to become smaller than the minimum injection amount Q min. Even in the case where the required injection amount per cylinder is smaller than the minimum injection amount Q min, the difference between the required injection amount per cylinder and the minimum injection amount Q min is unlikely to become large. That is, the required injection amount per cylinder is unlikely to become equal to or smaller than the minimum injection amount Q min. Therefore, the three-way catalyst 22 can be prevented from being supplied with an excessive amount of fuel, and the temperature of the three-way catalyst 22 can be restrained from rising excessively.

Figure 3:
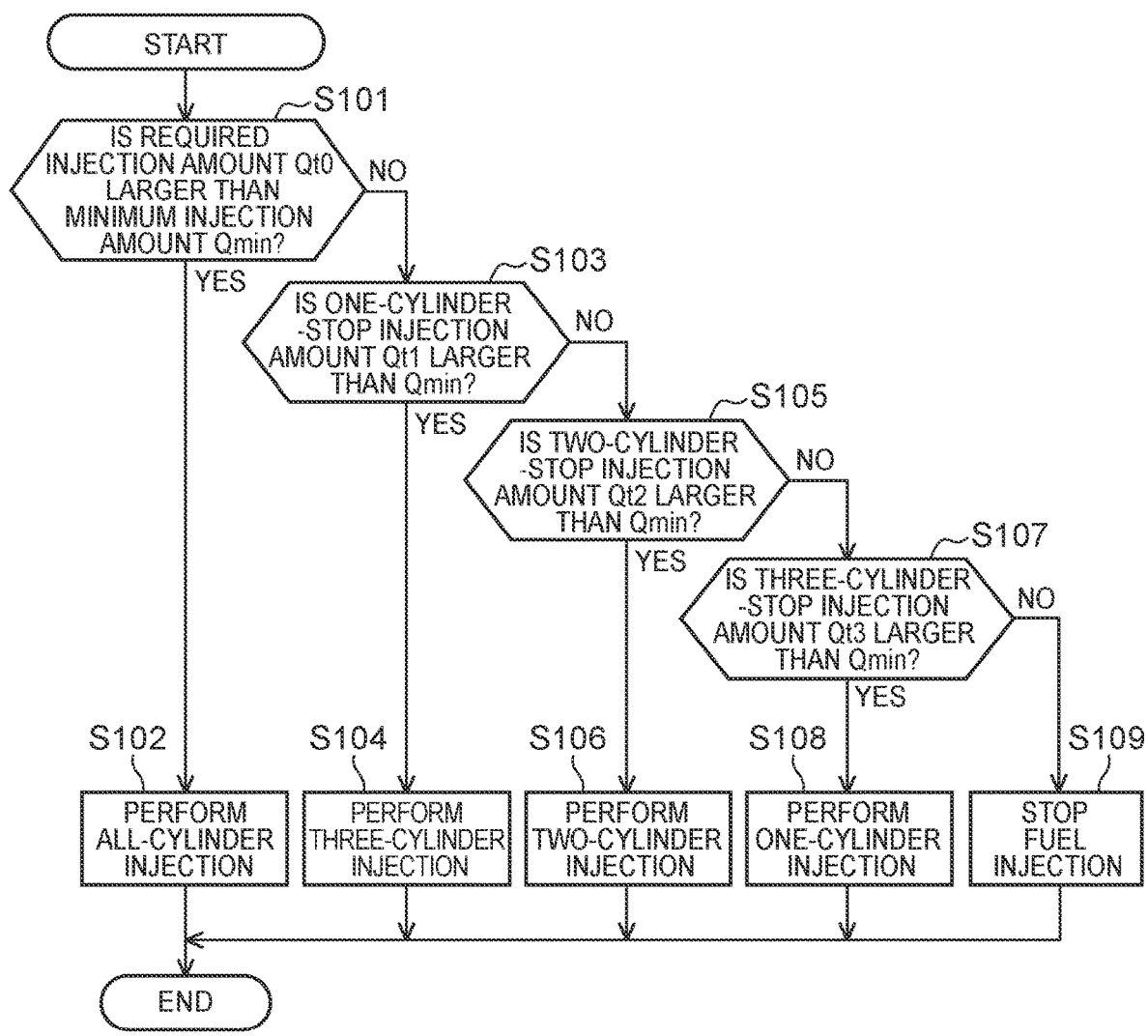
FIG. 3 is a flowchart showing the flow of a process that is performed by an injection valve control unit of the internal combustion engine control unit.

The control of the fuel injection valves 17 in the combustion stop period can be also performed according to the following procedure as well as the procedures shown in FIG. 3 and indicated in the above-described modification example. For example, the intake air amount GA increases as the engine rotational speed NE increases. That is, the series of processes concerning the control of the fuel injection valves 17 in the combustion stop period can be also performed through the use of first to fourth determination intake air amounts GATh1 to GATh4 (GATh1<GATh2<GATh3<GATh4) as determination values of the intake air amount GA.

Figure 9:
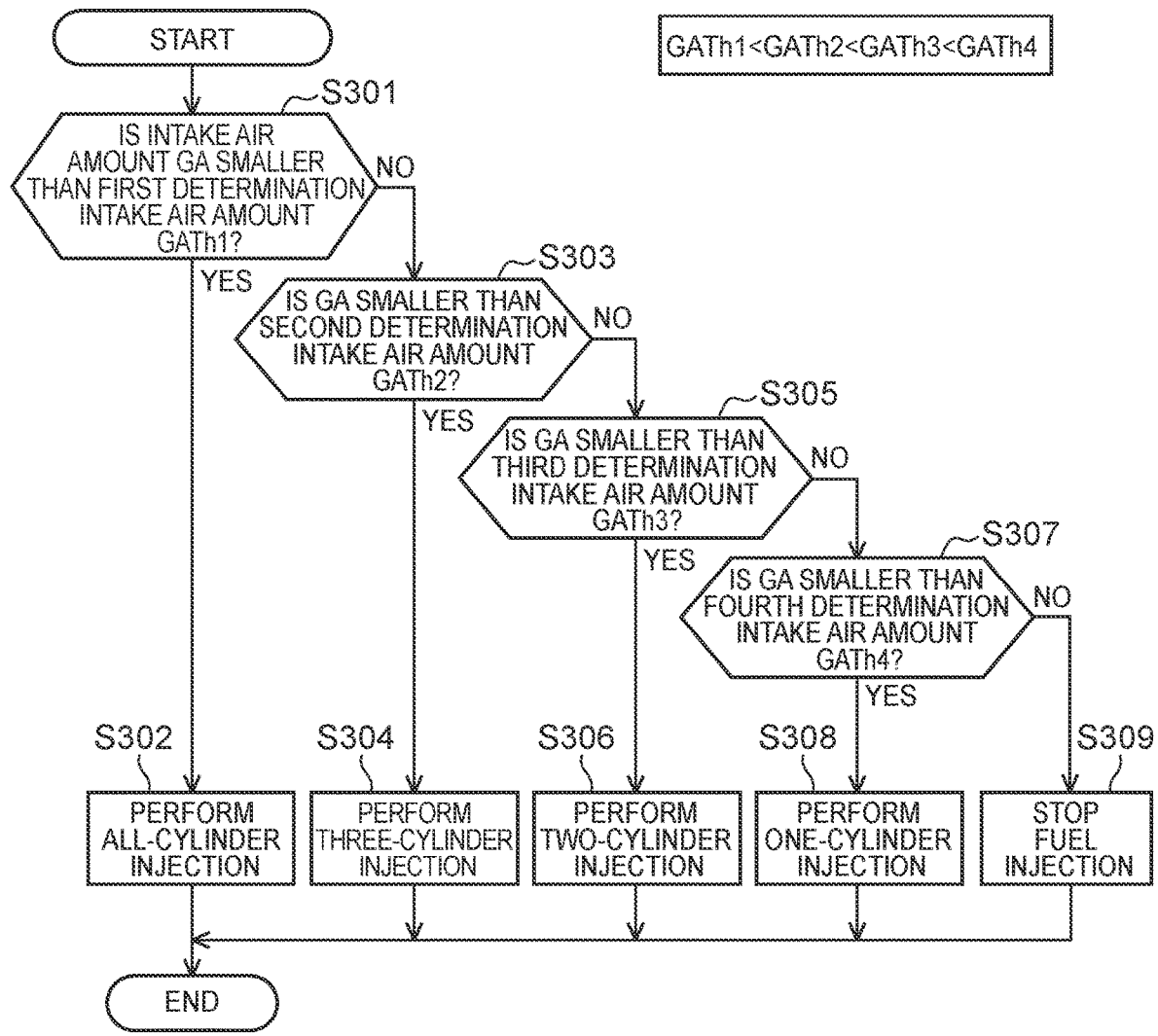
FIG. 9 is a flowchart showing the flow of a process that is performed by an internal combustion engine control unit according to another modification example.

The series of processes concerning the control of the fuel injection valves 17 in the combustion stop period will be described with reference to FIG. 9. The injection valve control unit 112 performs this series of processes. This series of processes is repeatedly performed when the above-described (Condition 1) and (Condition 2) are fulfilled in the combustion stop period.

When this series of processes is started, it is determined first in step S301 whether the intake air amount GA is smaller than the first determination intake air amount GATh1. If the intake air amount GA is smaller than the first determination intake air amount GATh1 (YES in S301), the processing is shifted to step S302. In step S302, a request to perform all-cylinder injection is made such that fuel is injected for all the cylinders 11. That is, the fuel introduction process is performed. After that, the series of processes is ended.

If the intake air amount GA is equal to or larger than the first determination intake air amount GATh1 (NO in S301), the processing is shifted to step S303. In step S303, it is determined whether the intake air amount GA is smaller than the second determination intake air amount GATh2. If the intake air amount GA is smaller than the second determination intake air amount GATh2 (YES in S303), the processing is shifted to step S304. In step S304, one of the cylinders 11 is selected according to the cylinder selection method, and a request to perform three-cylinder injection by stopping fuel from being injected for the cylinder 11 selected from the four cylinders 11 is made. That is, the fuel introduction process is performed in combination with the cylinder deactivation process. After that, the series of processes is ended.

If the intake air amount GA is equal to or larger than the second determination intake air amount GATh2 (NO in S303), the processing is shifted to step S305. In step S305, it is determined whether the intake air amount GA is smaller than the third determination intake air amount GATh3. If the intake air amount GA is smaller than the third determination intake air amount GATh3 (YES in S305), the processing is shifted to step S306. In step S306, two of the cylinders 11 are selected according to the cylinder selection method, and a request to perform two-cylinder injection by stopping fuel from being injected for the two cylinders 11 selected from the four cylinders 11 is made. That is, the fuel introduction process is performed in combination with the cylinder deactivation process. After that, the series of processes is ended.

If the intake air amount GA is equal to or larger than the third determination intake air amount GATh3 (NO in S305), the processing is shifted to step S307. In step S307, it is determined whether the intake air amount GA is smaller than the fourth determination intake air amount GATh4. If the intake air amount GA is smaller than the fourth determination intake air amount GATh4 (YES in S307), the processing is shifted to step S308. In step S308, three of the cylinders 11 are selected according to the cylinder selection method, and a request to perform one-cylinder injection by stopping fuel from being injected for the three cylinders 11 selected from the four cylinders 11 is made. That is, the fuel introduction process is performed in combination with the cylinder deactivation process. After that, the series of processes is ended.

If the intake air amount GA is equal to or larger than the fourth determination intake air amount GATh4 (NO in S305), the processing is shifted to step S309. In step S309, a request to stop fuel from being injected for all the four cylinders 11 is made. That is, the fuel cut-off process is performed without performing the fuel introduction process. After that, the series of processes is ended.

Even when the cylinder deactivation process is thus performed based on the intake air amount GA, the required injection amount per cylinder can be increased in accordance with the number of cylinders 11 for which fuel is stopped from being injected. Accordingly, the required injection amount per cylinder can be made unlikely to become smaller than the minimum injection amount Q min. Even when the required injection amount per cylinder becomes smaller than the minimum injection amount Q min, the difference between the required injection amount per cylinder and the minimum injection amount Q min is unlikely to become large. That is, the required injection amount per cylinder is unlikely to become equal to or smaller than the minimum injection amount Q min. Therefore, the three-way catalyst 22 can be prevented from being supplied with an excessive amount of fuel, and the temperature of the three-way catalyst 22 can be restrained from rising excessively.

The order of combustion in the cylinders 11 in the internal combustion engine 10 may be different from that of the above-described embodiment. When selecting the cylinder 11 or cylinders 11 for which fuel is stopped from being injected in the cylinder deactivation process, an effect similar to that of the above-described embodiment can be achieved if the cylinder 11 with the largest integrated injection amount Qac is first selected and the cylinder 11 that forms a pair with the cylinder 11 with the largest integrated injection amount Qac is then selected, regardless of the order of combustion.

In the above-described embodiment, the in-line four-cylinder internal combustion engine 10 is described as the internal combustion engine to which the internal combustion engine control unit 110 is applied. The internal combustion engine control unit 110 is applicable to other multi-cylinder internal combustion engines such as a V-type six-cylinder internal combustion engine, a V-type eight-cylinder internal combustion engine, an in-line six-cylinder internal combustion engine, an in-line eight-cylinder internal combustion engine and the like, as well as the in-line four-cylinder internal combustion engine. The in-line six-cylinder internal combustion engine will be described as a concrete example. In the case of the in-line six-cylinder internal combustion engine, the cylinder 11 with the largest integrated injection amount Qac is first selected when selecting the cylinder 11 or cylinders 11 for which fuel is stopped from being injected in the cylinder deactivation process, as is the case with the above-described embodiment. Then, in the case where fuel is stopped from being injected for two of the cylinders 11, the cylinder 11 with the largest integrated injection amount Qac and the cylinder 11 in which the intake stroke is not performed in succession to the intake stroke in the cylinder 11 with the largest integrated injection amount Qac (i.e., the cylinder 11 that does not undergo the intake stroke in succession to the cylinder 11 with the largest integrated injection amount Qac) are selected. For example, in the case where the in-line six-cylinder internal combustion engine is adopted and the cylinder deactivation process for stopping fuel from being injected for three of the cylinders 11 is performed, two of the cylinders 11 for which fuel is stopped from being injected may undergo the intake stroke in succession, in the order of undergoing the intake stroke, until the cylinders 11 undergo the intake stroke six times in succession. A concrete description will be provided with reference to FIG. 10.

Figure 10:
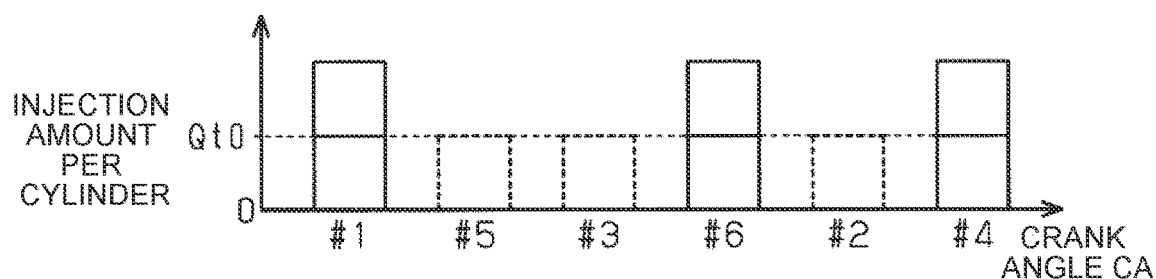
FIG. 10 is a view showing a manner of a cylinder deactivation process in the case where an internal combustion engine control unit is applied to an internal combustion engine according to yet another modification example.

FIG. 10 shows an example of the internal combustion engine in which combustion is performed in the order of the cylinder numbers "#1", "#5", "#3", "#6", "#2", and "#4". Fuel is stopped from being injected for the cylinders 11 whose cylinder numbers are "#5", "#3", and "#2" by performing the cylinder deactivation process. A broken line in the drawing indicates an injection amount per cylinder before stopping fuel injection. Among the cylinders 11 for which fuel is stopped from being injected, the cylinders 11 whose cylinder numbers are "#5" and "#3" undergo the intake stroke in succession, but the cylinder 11 whose cylinder number is "#2" does not undergo the intake stroke in succession to the cylinders 11 whose cylinder numbers are "#5" and "#3". In the case where the number of the cylinders 11 for which fuel is stopped from being injected is "3" and the number of the cylinders 11 of the internal combustion engine is "6", the number of cylinders 11 for which fuel is stopped from being injected in succession in the order of undergoing the intake stroke until the cylinders 11 undergo the intake stroke six times in succession is smaller than "3". Thus, when the number of cylinders 11 for which fuel is stopped from being injected in the cylinder deactivation process is N (N is an integer equal to or larger than 2) and the number of cylinders of the internal combustion engine is M (M is an integer larger than N), the cylinders for which fuel is stopped from being injected may be determined such that the number of cylinders for which fuel is stopped from being injected in succession in the order of undergoing the intake stroke until the cylinders undergo the intake stroke M times in succession becomes smaller than N. The timings for performing fuel injection can be dispersed by adopting this configuration. Then, the distribution of the concentration of fuel in the air-fuel mixture reaching the three-way catalyst 22 can thus be restrained from becoming non-uniform.

Even in the case where one cycle of the fuel introduction process is repeated a plurality of times, when the cylinders 11 for which fuel is stopped from being injected are determined in each cycle in the above-described manner, the distribution of the concentration of fuel in the air-fuel mixture reaching the three-way catalyst 22 can be restrained from becoming non-uniform. Even if the same cycle, in which the cylinders 11 for which fuel is stopped from being injected are determined as shown in FIG. 10, is repeated in the case where one cycle of the fuel introduction process is performed a plurality of times, the number of cylinders 11 for which fuel is stopped from being injected in succession in the order of undergoing the intake stroke until the cylinders undergo the intake stroke "6" times in succession is smaller than "3".

In the above-described embodiment, the integrated injection amount Qac is calculated in the period in which the fuel introduction process is performed. Instead of this, the integrated injection amount Qac may be calculated regardless of whether the condition for performing the fuel introduction process is fulfilled. That is, the integrated injection amount Qac may be calculated so as to include the amount of fuel injection in the period in which combustion is performed.

In the above-described embodiment, as shown in FIG. 3, when the required injection amount per cylinder is equal to or smaller than the minimum injection amount Q min as a result of a comparison between the required injection amount per cylinder and the minimum injection amount Q min, the required injection amount per cylinder after cylinder deactivation is computed, and this required injection amount and the minimum injection amount Q min are compared with each other. Instead of this, the required injection amount Qt0, the one-cylinder-stop injection amount Qt1, the two-cylinder-stop injection amount Qt2, and the three-cylinder-stop injection amount Qt3 may be computed in advance and compared with the minimum injection amount Q min. In this configuration, when the required injection amount Qt0 is larger than the minimum injection amount Q min, all-cylinder injection is performed. When the minimum injection amount Q min is equal to or larger than the required injection amount Qt0 and smaller than the one-cylinder-stop injection amount Qt1, three-cylinder injection is performed. When the minimum injection amount Q min is equal to or larger than the one-cylinder-stop injection amount Qt1 and smaller than the two-cylinder-stop injection amount Qt2, two-cylinder injection is performed. When the minimum injection amount Q min is equal to or larger than the two-cylinder-stop injection amount Qt2 and smaller than the three-cylinder-stop injection amount Qt3, one-cylinder injection is performed. That is, the number of cylinders 11 for which fuel is stopped from being injected is determined such that the required injection amount per cylinder becomes larger than the minimum injection amount Q min. Then, the number of cylinders 11 for which fuel is stopped from being injected is determined such that the number of cylinders 11 for which fuel is injected is maximized within a range where the required injection amount per cylinder is larger than the minimum injection amount Q min. In this configuration as well, the required injection amount per cylinder can be restrained from becoming smaller than the minimum injection amount Q min, as is the case with the above-described embodiment.

In the above-described embodiment, as a result of the advancement of the processing routine of the cylinder deactivation process shown in FIG. 3 and the comparison between the three-cylinder-stop injection amount Qt3 and the minimum injection amount Q min, fuel injection performed by all the fuel injection valves 17 is stopped when the three-cylinder-stop injection amount Qt3 is equal to or smaller than the minimum injection amount Q min. It should be noted herein that the three-cylinder-stop injection amount Qt3 coincides with the total injection amount Qb in the case where four cylinders 11 are provided as in the case of the internal combustion engine 10 according to the above-described embodiment. Therefore, it may be determined whether the total injection amount Qb is equal to or smaller than the minimum injection amount Q min when the cylinder deactivation process is started, and fuel injection performed by all the fuel injection valves 17 may be stopped when the total injection amount Qb is equal to or smaller than the minimum injection amount Q min.

In the above-described embodiment, fuel injection performed by all the fuel injection valves 17 is stopped when the three-cylinder-stop injection amount Qt3 is equal to or smaller than the minimum injection amount Q min. However, the fuel injection valves 17 may be controlled such that the minimum injection amount Q min of fuel is injected from one of the cylinders 11 when the three-cylinder-stop injection amount Qt3 is equal to or smaller than the minimum injection amount Q min. In the case where fuel is injected for only one cylinder due to the cylinder deactivation process, the difference between the required injection amount per cylinder and the minimum injection amount Q min is smaller than that in the case where fuel injection is not stopped by the cylinder deactivation process. Further, in the situation where fuel is injected for only one cylinder due to the cylinder deactivation process, the amount of actually injected fuel is smaller than that in the case where fuel is injected for all the cylinders. Therefore, even when the minimum injection amount Q min of fuel is injected, the temperature of the three-way catalyst 22 is unlikely to rise excessively.

In the above-described embodiment, the cylinder 11 or cylinders 11 for which fuel is stopped from being injected is/are determined such that the distribution of the concentration of fuel in the air-fuel mixture reaching the three-way catalyst 22 is restrained from becoming non-uniform. If the non-uniformity of the distribution of the concentration of fuel in the air-fuel mixture reaching the three-way catalyst 22, which can be caused by the cylinder deactivation process, falls within a permissible range, the cylinders 11 can be also selected in descending order of the integrated injection amount Qac, as the cylinders for which fuel is stopped from being injected. The permissible range of the non-uniformity is a range where the temperature of the three-way catalyst 22 can be maintained at an appropriate temperature even when the air-fuel mixture with a relatively low concentration of fuel is continuously introduced into the three-way catalyst 22 for a long period of time.

In the above-described embodiment, in the cylinder deactivation process, the number of cylinders for which fuel is stopped from being injected is increased one by one (i.e., increased by one at a time), based on the comparison between the required injection amount per cylinder and the minimum injection amount Q min. However, the number of cylinders for which fuel is stopped from being injected may be increased two by two (i.e., increased by two at a time). A concrete description will be provided, citing an example of a six-cylinder internal combustion engine. When the minimum injection amount Q min is equal to or larger than the required injection amount per cylinder in the case where fuel is injected for the six cylinders, fuel is stopped from being injected for two of the cylinders by the cylinder deactivation process. Subsequently, when the minimum injection amount Q min is equal to or larger than the required injection amount per cylinder in the case where fuel is stopped from being injected for two of the cylinders, fuel is stopped from being injected for four of the cylinders by the cylinder deactivation process. Furthermore, when the minimum injection amount Q min is equal to or larger than the required injection amount per cylinder in the case where fuel is stopped from being injected for four of the cylinders, the fuel cut-off process is performed without performing the fuel introduction process.

In the above-described embodiment, in the cylinder deactivation process, the number of cylinders for which fuel is stopped from being injected is increased one by one, based on the comparison between the required injection amount per cylinder and the minimum injection amount Q min. For example, in the case of a six-cylinder internal combustion engine, the series of processes for controlling the fuel injection valves 17 may be performed so as to select whether to inject fuel for all the cylinders, to stop fuel from being injected for three of the cylinders, or to perform the fuel cut-off process without performing the fuel introduction process.

During the fuel introduction process, fuel may be stopped from being injected for at least one of the cylinders. That is, the cylinder deactivation process may be performed such that the number of cylinders for which fuel is injected becomes smaller than the number of cylinders of the internal combustion engine, during the fuel introduction process. The required injection amount per cylinder increases in accordance with the number of cylinders for which fuel is stopped from being injected, through the cylinder deactivation process. Therefore, in the above-described configuration, the required injection amount per cylinder is unlikely to become smaller than the minimum injection amount, as compared to the case where fuel is injected for all the cylinders, or the difference between the required injection amount per cylinder and the minimum injection amount is unlikely to become large even in the case where the required injection amount per cylinder becomes smaller than the minimum injection amount. As a result, the three-way catalyst can be prevented from being supplied with an excessive amount of fuel, and the temperature of the three-way catalyst can be restrained from rising excessively.

In the above-described embodiment, in the cylinder deactivation process, when the required injection amount per cylinder is equal to or smaller than the minimum injection amount Q min, the number of cylinders for which fuel is stopped from being injected is increased. In the cylinder deactivation process, fuel injection may be performed based on the required injection amount per cylinder when the required injection amount is equal to the minimum injection amount Q min. For example, the processing of step S102 may be performed when the required injection amount Qt0 is equal to the minimum injection amount Q min in step S101 of FIG. 3. The processing of step S104 may be performed when the one-cylinder-stop injection amount Qt1 is equal to the minimum injection amount Q min in step S103. The processing of step S106 may be performed when the two-cylinder-stop injection amount Qt2 is equal to the minimum injection amount Q min in step S105. The processing of step S108 may be performed when the three-cylinder-stop injection amount Qt3 is equal to the minimum injection amount Q min in step S107.

In the above-described embodiment, the three-way catalyst 22, and the particulate filter 23 that is disposed downstream of the three-way catalyst 22 are provided in the exhaust passage 21. The particulate filter 23 is not an indispensable component.

In each of the above-described embodiment and the above-described modification examples, the ignition device 19 is stopped from performing spark discharge during the fuel introduction process. However, during the fuel introduction process, the ignition device 19 may be caused to perform spark discharge in the period in which the air-fuel mixture does not burn in the cylinders 11. For example, in the case where spark discharge is performed when one of the pistons is located in the vicinity of a bottom dead center, the air-fuel mixture is not burned in the cylinder 11 in which spark discharge is performed. Therefore, during the fuel introduction process, the fuel that is injected from each of the fuel injection valves 17 and remains unburned can be caused to flow out from the corresponding one of the cylinders 11 to the exhaust passage 21, even when spark discharge is performed.

The internal combustion engine to which the control apparatus for the internal combustion engine is applied may include in-cylinder injection valves, namely, fuel injection valves that directly inject fuel for the cylinders 11 respectively. In this case, as the fuel introduction process, fuel may be injected for the cylinders 11 from the in-cylinder injection valves respectively, and the fuel that remains unburned may be caused to flow out to the exhaust passage 21. Thus, the unburned fuel can be introduced into the three-way catalyst 22.

The system of the hybrid vehicle may be different from the system shown in FIG. 1, as long as the rotational speed of the crankshaft 14 can be controlled by driving the motor.

The control apparatus for the internal combustion engine may be embodied into an apparatus that is applied to an internal combustion engine mounted in a vehicle that does not include any power source other than the internal combustion engine. Even in the case of the internal combustion engine mounted in such a vehicle, the required injection amount per cylinder can be restrained from becoming equal to or smaller than the minimum injection amount Q min by the cylinder deactivation process. Thus, the three-way catalyst 22 can be prevented from being supplied with an excessive amount of fuel, and the temperature of the three-way catalyst 22 can be restrained from rising excessively.

What is claimed is:

1. A control apparatus for an internal combustion engine including a plurality of cylinders; a plurality of fuel injection valves configured to supply fuel to the plurality of cylinders, respectively; an ignition device configured to perform spark discharge to burn, in the plurality of cylinders, an air-fuel mixture containing the fuel injected from the plurality of fuel injection valves; and a three-way catalyst that is provided in an exhaust passage, the control apparatus comprising
an electronic control unit configured to
i) perform a fuel introduction process for causing the plurality of fuel injection valves to inject the fuel and causing the fuel that remains unburned to flow out from the plurality of cylinders to the exhaust passage, when combustion of the air-fuel mixture in the plurality of cylinders is stopped in a situation where a crankshaft of the internal combustion engine rotates,
ii) calculate a total injection amount in the fuel introduction process, and control each of the plurality of fuel injection valves based on a required injection amount per cylinder that is obtained by dividing the total injection amount in accordance with the number of the fuel injection valves that inject the fuel, when the fuel introduction process is performed, and
iii) perform a cylinder deactivation process for stopping the fuel from being injected for one or some of the plurality of cylinders, and controlling each of the plurality of fuel injection valves such that an amount of the fuel obtained by dividing the total injection amount is injected for a cylinder or cylinders other than the one or some of the plurality of cylinders for which the fuel is stopped from being injected, when the fuel introduction process is performed,
wherein the electronic control unit is configured to calculate an integrated value of an injection amount in a period in which the fuel introduction process is performed, as an integrated injection amount, for each of the plurality of cylinders, and to stop the fuel from being injected for a cylinder having the integrated injection amount that is the largest among the integrated injection amounts of the plurality of cylinders, in the cylinder deactivation process.

2. The control apparatus for the internal combustion engine according to claim 1, wherein the electronic control unit is configured to calculate the total injection amount such that the total injection amount decreases as an engine rotational speed of the internal combustion engine increases, when the fuel introduction process is performed.

3. The control apparatus for the internal combustion engine according to claim 2, wherein the electronic control unit is configured to increase the number of cylinders for which the fuel is stopped from being injected among the plurality of cylinders as the engine rotational speed increases, when the cylinder deactivation process is performed.

4. The control apparatus for the internal combustion engine according to claim 1, wherein the electronic control unit is configured to determine cylinders for which the fuel is stopped from being injected such that the number of cylinders for which the fuel is stopped from being injected in succession in an order of undergoing an intake stroke until the plurality of cylinders undergo the intake stroke M times in succession becomes smaller than N, in a case where the number of the cylinders for which the fuel is stopped from being injected in the cylinder deactivation process is N, N is an integer equal to or larger than 2, the number of the plurality of cylinders of the internal combustion engine is M, and M is an integer larger than N.

5. The control apparatus for the internal combustion engine according to claim 1, wherein the electronic control unit is configured to determine cylinders for which the fuel is stopped from being injected such that the cylinders for which the fuel is stopped from being injected do not undergo an intake stroke in succession, when the fuel is stopped from being injected for two or more of the plurality of cylinders in the cylinder deactivation process.

6. The control apparatus for the internal combustion engine according to claim 1, wherein the electronic control unit is configured to determine the number of cylinders for which the fuel is stopped from being injected such that the required injection amount does not become smaller than a minimum injection amount for each of the plurality of fuel injection valves, in the cylinder deactivation process.

7. The control apparatus for the internal combustion engine according to claim 6, wherein the electronic control unit is configured to determine the number of the cylinders for which the fuel is stopped from being injected such that the number of cylinders for which the fuel is injected is maximized on a condition that the required injection amount does not become smaller than the minimum injection amount, in the cylinder deactivation process.

8. The control apparatus for the internal combustion engine according to claim 1, wherein the electronic control unit is configured to stop all the plurality of fuel injection valves from injecting the fuel, without performing the fuel introduction process, when the total injection amount is smaller than a minimum injection amount for each of the plurality of fuel injection valves.

* * * * *